United States Patent
Row, II et al.

(10) Patent No.: US 9,479,632 B2
(45) Date of Patent: Oct. 25, 2016

(54) METHODS OF OPERATING WIRELESS PARAMETER-SENSING NODES AND REMOTE HOST

(71) Applicant: Oceus Networks, Inc., Reston, VA (US)

(72) Inventors: James Thomas Row, II, Plano, TX (US); Joseph Lawrence Uelk, Dallas, TX (US); Faraz H Jafferi, Frisco, TX (US); Christopher Allen Hill, Plano, TX (US); Vincent Charles Graffagnino, Prosper, TX (US); Stacy Louise Devino, Carrollton, TX (US); Danny Tseng, Frisco, TX (US); Eric Luong, North Richland Hills, TX (US); David Harlow Sin, Frisco, TX (US)

(73) Assignee: OCEUS NETWORKS, INC., Reston, VA (US)

( * ) Notice: Subject to any disclaimer, the term of this patent is extended or adjusted under 35 U.S.C. 154(b) by 0 days.

(21) Appl. No.: 14/728,491

(22) Filed: Jun. 2, 2015

(65) Prior Publication Data
US 2016/0156769 A1    Jun. 2, 2016

Related U.S. Application Data

(62) Division of application No. 14/556,601, filed on Dec. 1, 2014, now Pat. No. 9,055,163.

(51) Int. Cl.
| | |
|---|---|
| *H04W 24/00* | (2009.01) |
| *H04W 72/00* | (2009.01) |
| *H04W 36/00* | (2009.01) |
| *H04M 1/725* | (2006.01) |

(Continued)

(52) U.S. Cl.
CPC ..... *H04M 1/72538* (2013.01); *H04M 1/72569* (2013.01); *H04W 4/22* (2013.01); *H04W 24/10* (2013.01)

(58) Field of Classification Search
CPC .................. H04W 8/005; H04W 52/0254
USPC ...................... 455/438, 450, 456.1
See application file for complete search history.

(56) References Cited

U.S. PATENT DOCUMENTS

| | | |
|---|---|---|
| 5,995,041 A | 11/1999 | Bradley et al. |
| 6,694,156 B2 | 2/2004 | Seo |
| 6,741,168 B2 | 5/2004 | Webb et al. |

(Continued)

FOREIGN PATENT DOCUMENTS

WO    WO2014/049789    4/2014

OTHER PUBLICATIONS

"Altiris™ IT Management Suite 7.1 SP2 from Symantec™ Planning and Implementation Guide," Created Oct. 19, 2011, Updated: Jan. 28, 2013, URL= http://www.symantec.com/docs/DOC4827.

(Continued)

*Primary Examiner* — William D Cumming
(74) *Attorney, Agent, or Firm* — Symbus Law Group, LLC; Charles B. Lobsenz

(57) ABSTRACT

Discretely-mobile parameter-sensing nodes, such as mobile phones, may be connected to a remote host. Each of the nodes is capable of sensing parametric values that are internal, and ambient to the node. The values may relate to atypical movement of a group of users, such as warfighters, that are associated with the nodes. Upon analysis of the atypical movement, the status (e.g., health) of a user associated with a node involved in such movement can be ascertained.

10 Claims, 13 Drawing Sheets

(51) Int. Cl.
*H04W 4/22* (2009.01)
*H04W 24/10* (2009.01)

(56) References Cited

U.S. PATENT DOCUMENTS

| | | | |
|---|---|---|---|
| 6,812,832 B2 | 11/2004 | Lobaza et al. | |
| 6,825,758 B1 | 11/2004 | Laitsaari | |
| 6,999,780 B1 | 2/2006 | Zhao | |
| 7,321,783 B2 | 1/2008 | Kim | |
| 7,908,440 B2 | 3/2011 | Kuris et al. | |
| 8,112,807 B2 | 2/2012 | Taylor et al. | |
| 8,194,568 B1* | 6/2012 | Arnold | H04L 41/18 370/230 |
| 8,217,795 B2 | 7/2012 | Carlton-Foss | |
| 8,325,053 B2 | 12/2012 | Flynt et al. | |
| 8,527,457 B2 | 9/2013 | Moon et al. | |
| 8,589,089 B2 | 11/2013 | Lahaie et al. | |
| 8,593,286 B2 | 11/2013 | Razoumov et al. | |
| 8,618,934 B2 | 12/2013 | Belov et al. | |
| 8,747,336 B2 | 6/2014 | Tran | |
| 8,773,269 B2 | 7/2014 | Richardson et al. | |
| 8,798,582 B2 | 8/2014 | Chang et al. | |
| 9,055,163 B1* | 6/2015 | Row, II | H04M 1/72538 |
| 2004/0077354 A1* | 4/2004 | Jason | H04W 8/005 455/450 |
| 2006/0241521 A1 | 10/2006 | Cohen | |
| 2010/0080175 A1 | 4/2010 | Kang et al. | |
| 2010/0304754 A1* | 12/2010 | Czompo | H04W 52/0254 455/456.1 |
| 2011/0215931 A1 | 9/2011 | Callsen et al. | |
| 2011/0275322 A1 | 11/2011 | Sawai et al. | |
| 2012/0282933 A1* | 11/2012 | Hofstaedter | G06F 15/173 455/438 |
| 2012/0329439 A1 | 12/2012 | Ge | |
| 2013/0027541 A1 | 1/2013 | Hollis et al. | |
| 2013/0257650 A1 | 10/2013 | Miyake | |
| 2013/0278414 A1 | 10/2013 | Sprigg et al. | |
| 2014/0074979 A1 | 3/2014 | Singh et al. | |

OTHER PUBLICATIONS

"What Tasks "Server" Are you Using?," Michael Linengerger, Created Apr. 26, 2011, Updated Mar. 3, 2014, URL= http://www.michaellinenberger.com/blog/what-tasks-server-are-you-using/.

"Improved noncontact optical sensor for detection of glucose concentration and indication of dehydration level," Nisan Ozana et al., Biomedical Optics Express, vol. 5, Issue 6, pp. 1926-1940, 2014, URL= http://dx.doi.org/10.1364/BOE.5.001926 Alternate URL= http://www.opticsinfobase.org/boe/viewmedia.cfm?uri=boe-5-6-1926&seq=.

* cited by examiner

METHODS OF OPERATING WIRELESS PARAMETER-SENSING NODES AND REMOTE HOST

CROSS-REFERENCE TO RELATED APPLICATION

This application is a divisional of U.S. patent application Ser. No. 14/556,601, filed on Dec. 1, 2014, which is hereby incorporated in its entirety by reference herein.

FIELD OF THE DISCLOSURE

Embodiments of the present invention relate to mobile parameter-sensing nodes (e.g., mobile phones) connectable via wireless connections (e.g., mobile telephony) to a remote host (e.g., a base station, NIB, etc.), and more particularly to methods of operating the mobile parameter-sensing nodes and methods of operating the remote host.

BACKGROUND

In a wireless communication network, nodes are connected wirelessly to the network. In some wireless networks, the wirelessly-connected nodes are themselves physically mobile, e.g., a conventional mobile-telephony network. While user equipment (UE), e.g., mobile telephones, attached to a conventional mobile-telephony network are themselves physically mobile, their communication is supported by physically stationary infrastructure, namely stationary base stations in different locations that communicate with a remote, stationary mobile-telephone-switching office (MTSO). A given one of the UEs can move from the coverage area of a first base station into the coverage area of a second base station. To facilitate the handoff of a given UE from the first base station to the second base station, some received signal strength data are collected by and received from the given UE by the first base station.

Many locations throughout the world lack such physically-stationary network infrastructures and/or exist under conditions that deter, if not prevent, construction of the same. In a war zone, for example, building stationary network infrastructure is not feasible due, e.g., to the transient nature of military personnel and equipment.

One device that can be used to improve communications in such environments is a mobile cellular network (MCN) communication system. Aside from the UEs, in an MCN, all of the components of a typical cellular network reside in one device (referred to herein as a network-in-a-box (NIB)). The NIB itself is mobile. The MCN provides an example of a wireless network in which not only the wirelessly-connected nodes themselves are physically mobile, but the infrastructure that supports their communication (namely, the NIB) also is physically mobile.

The NIB is self-contained in that it does not need to communicate with other base stations or an MTSO to provide complete cellular network functionality to instances of user equipment (UEs) within its area of coverage. One example of a commercially available NIB is the XIPHOS™ available from OCEUS NETWORKS™.

As an NIB moves, the network coverage (that it provides) moves with it. To increase the range of a MCN, multiple NIBs can be networked together to create a network of MCN communication systems, also referred to herein as a NOM. Among other things, the MCN communication system can perform handover operations when a UE moves from one coverage area to another coverage area within the NOM. Furthermore, if an MCN communication system moves from one location to another, the NOM can allocate affected UEs between the moving MCN communication system and other MCN communication systems in the area.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a method of operating a mobile parameter-sensing node connectable via a wireless connection to a remote host, the method comprising: sampling values of parameters that are at least one of internal to and ambient to the node, respectively; selectively collecting data representing at least some of the sampled values according to at least one a first subject list defining which ones amongst the parameters will have data representative thereof collected and a first frequencies-of-collection list of collection frequencies at which the data are to be collected, respectively; analyzing, locally to the node, at least some of the collected data in terms of one or more alarm criteria; and selectively collecting data according to at least one of a second subject list and a second frequencies-of-collection list when one or more of the alarm criteria are satisfied, the second subject list and the second frequencies-of-collection list being more inclusive than the first subject list and the second frequencies-of-collection list, respectively.

Another aspect of the present invention provides a method of operating a remote host in a network of discretely-mobile wireless parameter-sensing nodes, each node including sensors for sampling values of parameters that are at least one of internal to and ambient to the node, respectively, and circuitry to collect data representing the sampled values, respectively, and send the same to a remote host, the method comprising: receiving the collected data from the discretely-mobile nodes, respectively; filtering the collected data for spikes; grouping the spikes into parameter-specific groups, respectively; arranging, within parameter-specific groups, the spikes into batches of substantially coincidental spikes; inferring that nodes exhibiting spikes in the same batches have been effected by one or more events in common, respectively; and adaptively instructing one or more of the following, (A) at least one of the effected nodes and (B) at least one node proximate to the effected nodes, to execute one or more tasks that are responsive to the one or more common events, respectively.

A further aspect of the present invention provides a method of operating a remote host in a network of discretely-mobile wireless parameter-sensing nodes, each node including sensors for sampling values of parameters that are at least one of internal to and ambient to the node, respectively, and circuitry to collect data representing the sampled values, respectively, and send the same to a remote host, the method comprising: receiving the collected data from the discretely-mobile nodes, respectively; organizing the collected data into groups according to proximity of the corresponding nodes, respectively; determining group-specific ranges regarded as typical based on the collected data corresponding to the groups, respectively; recognizing, within the groups, respectively, if there are one or more nodes exhibiting atypical collected data; and adaptively instructing, within the groups, respectively, at least one of the nodes to execute one or more tasks that are responsive to the determination of atypical collected data.

Yet another aspect of the present invention provides a method of operating a remote host in a network of one or more discretely-mobile wireless parameter-sensing nodes, each node being disposable in a holster worn by a user, each node including sensors for sampling values of parameters that are at least one of internal to and ambient to the node, respectively, and circuitry to collect data representing the sampled values, respectively, and send the same to a remote host, the method comprising: receiving portions of the collected data from a given one of the one or more discretely-mobile nodes including holstering status and motion-data representing sampled values of motion parameters; inspecting the holstering status to identify if the node is holstered on the user; analyzing the motion-data of the holstered node according to human-physiology constraints; and adaptively instructing the node to execute one or more tasks that are responsive to results of the analysis.

These and further and other objects and features of the present invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein.

DETAILED DESCRIPTION

Figure 1A:
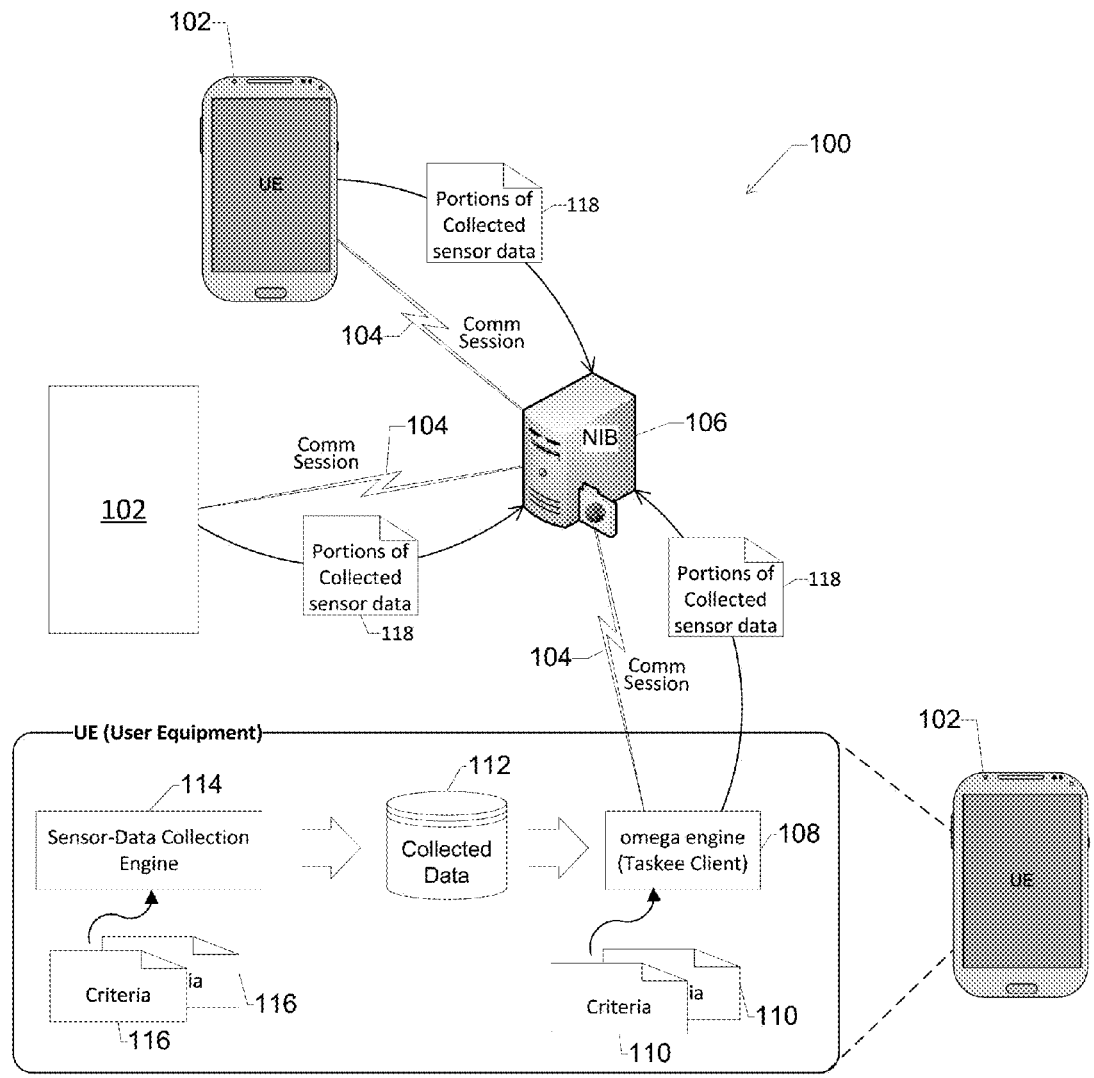
FIG. 1A is a block diagram of a network of wireless parameter-sensing nodes, according to an embodiment of the present invention.

Embodiments of wireless parameter-sensing node in a network thereof will now be disclosed in terms of various exemplary embodiments. This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

In developing embodiments of the present invention, among other things, the inventors thereof:

were mindful that reducing bandwidth consumption is an ongoing design consideration and managing bandwidth consumption is an ongoing management consideration in general for wireless communication networks, in particular for a conventional mobile-telephony network, and yet more particularly for a mobile cellular network (MCN) communication system;

recognized, in the context of a UE-handover in an MCN communication system, that it may be beneficial for a given UE to collect more signal strength data and provide the same to the NIB than is typically collected and received in preparation for a handover in the conventional mobile-telephony network by a base station;

recognized, not only in the circumstance of a UE-handover but in other circumstances in the context of an MCN communication system, that it may be beneficial for a given UE to collect data (and provide the same to the NIB) that is not collected by a conventional UE and/or that is collected by a conventional UE but not received by a base station in the conventional mobile-telephony network;

recognized that the desired amount of data that is collected by a given UE and/or that is retrieved by an NIB varies on a per-UE basis, i.e., varies between different instances of a UE (even under circumstances in which all of the UEs served by the NIB are instances of substantially the same combination of hardware and software);

recognized that the per-UE variation in the desired amount of data that is collected by a given UE and/or that is retrieved by an NIB varies according to multiple factors including (but not limited to):
  the location of the given UE relative to the NIB;
  the motion of the given UE relative to the NIB;
  the time of day (in general);
  the mission-requirements of the user on which is borne the given UE (e.g., where the user is a warrior in the context of a war zone, a rescuer in the context of a disaster-response scenario, etc.);
  the momentary phase of a multi-phase mission of the user on which is borne the given UE (e.g., where the user is a warrior in the context of a war zone, a rescuer in the context of a disaster-response scenario, etc.); and
  the momentary level of danger being encountered by the user on which is borne the given UE (e.g., where the user is a warrior in the contexts of a war zone, a rescuer in the context of a disaster-response scenario, etc.);
recognized that the desired amount of data collection by an NIB relative to a given UE varies depending on the circumstances under which the NIB is operating, e.g., at a given moment, the NIB might be servicing other UEs which are facing more demanding circumstances than the given UE such that the priority-level attributed to collecting data by the other UEs and/or receiving collected data therefrom at that time is higher than the priority-level for the given UE; and
recognized that (1) a UE which has at least one of dynamically reconfigurable data collection capability, dynamically reconfigurable local data storage capability, dynamically reconfigurable local data retrieval capability and dynamically reconfigurable capability of sending collected data to host (e.g., an NIB) and (2) a host (e.g., an NIB) that can dynamically control such reconfigurations can advantageous, e.g., in terms of facilitating the management of bandwidth consumption in general for wireless communication networks, and in particular for an NIB.

One or more embodiments of the present invention provide an MCN communication system that includes such a dynamically reconfigurable UE and a corresponding NIB that can dynamically control such reconfiguration, and more particularly provides methods of operating the UEs (mobile parameter-sensing nodes) and methods of operating the base station or NIB (the remote host).

FIG. 1A is a block diagram of a network 100 of wireless parameter-sensing nodes, according to an embodiment of the present invention.

In FIG. 1A, network 100 includes multiple nodes 102 that communicate wirelessly, i.e., via wireless communication sessions 104, respectively, with a remote host 106. For example, network 100 can be a mobile-telephony network or a mobile cellular network (MCN) communication system such that host 106 is a base station or a network-in-a-box (NIB), respectively, and nodes 102 are instances of user equipment (UE) that can engage in radio telephony with NIB 106. Among other things, NIB 106 includes a wireless interface, e.g., an LTE (Long Term Evolution) modem (not illustrated), a WiFi modem (not illustrated), etc., by which to communicate with nodes 102 via wireless communication sessions 104, respectively.

An instance of node 102 can be any device that includes a wireless interface, e.g., an LTE modem (not illustrated), a WiFi modem, etc., by which to communicate with NIB 106 via a wireless communication session 104. For example, node 102 can be a mobile phone (e.g., a smart mobile phone running the ANDROID™ operating system, a laptop/notebook computer, a tablet computer, a dedicated GPS (Global Positioning System) receiver, a smart sensor, etc.) Additionally, such LTE-modem-equipped devices further include computing components (not illustrated in FIG. 1A), e.g., one or more processor units, one or more communications buses, one or more memories, one or more interfaces (e.g., a man-machine interface), etc. Each UE 102 communicates with NIB 106 via a wireless communication session 104, respectively.

Also included in FIG. 1A is an exploded of one of UEs 102 that illustrates some (but not all) of the operational components of UEs 102. As such, each UE 102 includes: an omega engine 108; dynamically reconfigurable criteria 110 by which the operation of omega engine 108 is controlled; a memory 112 to store collected data locally; a sensor-data collection engine 114; and dynamically reconfigurable criteria 116 by which the operation of collection engine 114 is controlled. Criteria 110 and 116 can be stored in one or more of the noted (above) albeit not-illustrated (in FIG. 1A) memories. Omega engine 108 and collection engine 114 can be implemented, for example, as executable code (e.g., an ANDROID™ background service) stored in one or more of the noted (above) albeit not-illustrated (in FIG. 1A) memories in UE 102 and executed by one or more of the noted (above) albeit not-illustrated (in FIG. 1A) processor units in UE 102, respectively. For ease of illustration, communication session 104 is illustrated as terminating in omega engine 108.

A detailed discussion of the components and operation of UEs 102 and NIB 106 appear below in the discussion of other FIGS. Briefly, however, it should be understood that UE 102 also includes operational components (not illustrated in FIG. 1A) and various sensors (not illustrated in FIG. 1A) which sense parameters (at least some of which are operational parameters of the operational components) and sample the same to thereby generate data representing the sampled values, respectively. According to instances of criteria 116, collection engine 114 selectively collects data representing at least some of the sampled values, respectively, and stores the collected sensor data into memory 112. According to instances of criteria 110, omega engine 106 selectively retrieves portions of the collected data from memory 112 and periodically sends the selected portions to NIB 106 in messages 118 during wireless communication sessions 104, respectively.

In other words, network 102 of FIG. 1A is an example of a mobile cellular network (MCN) communication system that includes: dynamically reconfigurable UEs 102; and a corresponding NIB 106 that can dynamically and selectively control the reconfiguration of UEs 102.

Figure 1B:
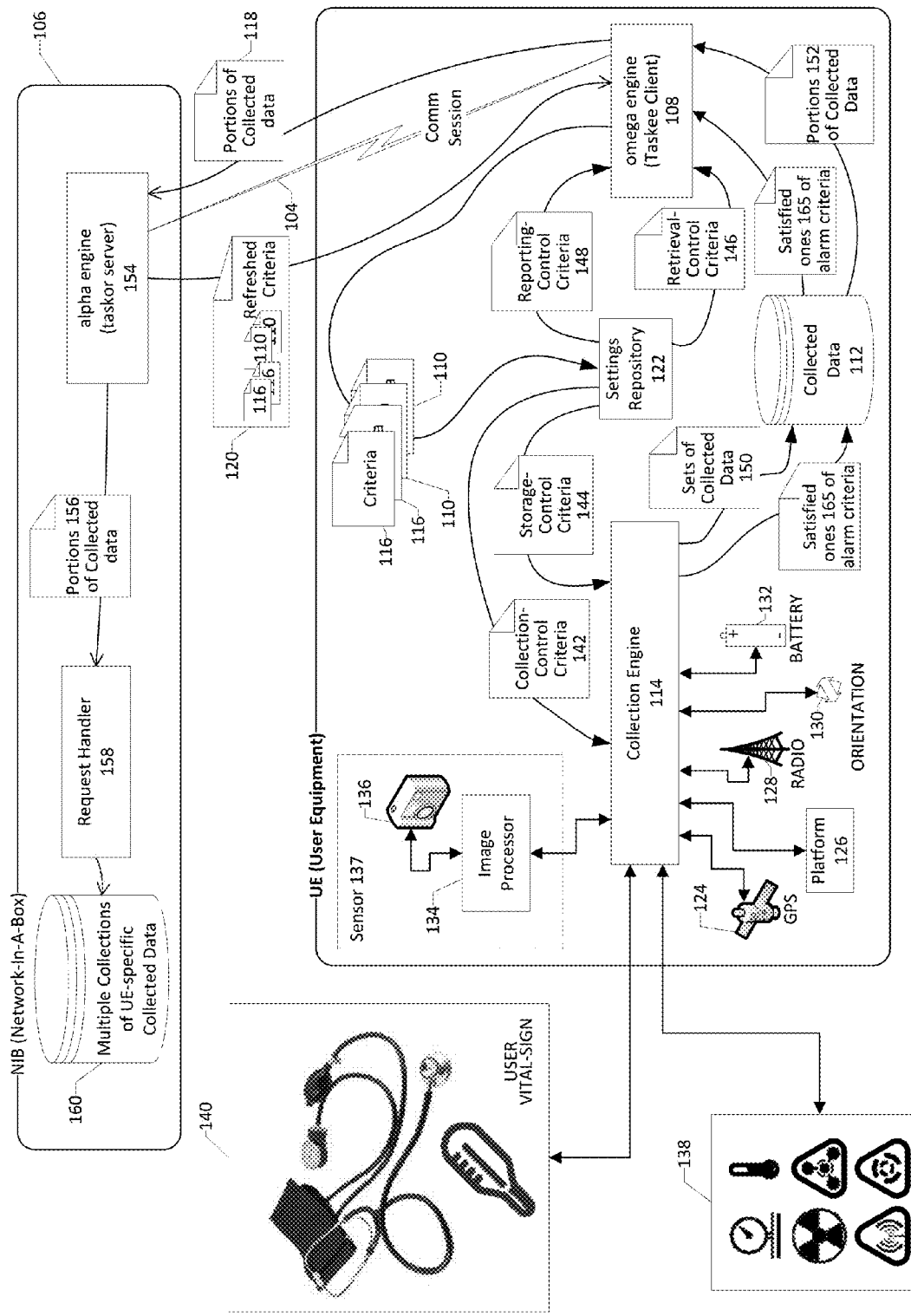
FIG. 1B is a more detailed block diagram of one of the UEs and the NIB of FIG. 1A, according to an embodiment of the present invention.

FIG. 1B is a more detailed block diagram of one of UEs 102 and NIB 106, according to an embodiment of the present invention.

As briefly introduced above (in the discussion of FIG. 1A), UE 102 includes various sensors, which can be internal components of UE 102 and/or discrete external components coupled to UE 102. At least some of the internal sensors can be configured to sense at least some of the operational parameters of the operational components of UE 102. Some (but not all) of the various sensors are illustrated in FIG. 1B. Examples of such sensors include: a position sensor 124, e.g., based on a global positioning system (GPS) receiver (not illustrated in FIG. 1B; one or more platform sensors 126; one or more sensors 128 associated with and measuring operating parameters of a radio-telephony system (not illustrated in FIG. 1B), respectively; an orientation sensor 130, e.g., based on a geomagnetic field sensor (not illustrated in FIG. 1B) and one or more accelerometers (not illustrated in FIG. 1B); and one or more sensors 132 associated with and measuring operating parameters of a power system (not illustrated in FIG. 1B), respectively.

Parameters from sensors 124-132 can be grouped into a set of domains. More particularly, parameters associated with sensors 124 and 130 can be included in a location domain. Examples of parameters in the location domain associated with sensor 124 include: a GPS-derived altitude; a GPS-derived latitude; a GPS-derived longitude; a GPS-derived time; a GPS-derived heading; etc. Examples of parameters in the location domain associated with sensor 132 include: a multi-dimensional array including geomagnetic field strength values for each coordinate axis in a standard three-axis coordinate system; a multi-dimensional array including azimuth (yaw), pitch, and roll values, etc.

Parameters associated with the one or more sensors 128 can be included in a telephony domain. Examples of parameters in the telephony domain associated with the one or more sensors 128 include: an Access Point Name (APN); a Channel Quality Indicator (CQI); an Internet Protocol (IP) address; a Public Land Mobile Network (PLMN) identifier; a Reference Signal Received Power (RSRR) indicator; a Reference Signal Received Quality (RSRQ) indicator; a Reference Signal Signal-To-Noise Ratio (RSSNR) indicator; etc.

Parameters associated with the one or more sensors 132 can be included in a power domain. Examples of parameters in the power domain associated with the one or more sensors 132 include: a health index of a battery on the mobile device; a charge level indicating a level of charge remaining in the battery; a plugged state indicator of whether a battery-charger is being charged by a charger; a battery presence indicator of whether a battery is present on the mobile device; a battery status indicator of whether the battery is charging or discharging; a battery temperature; a battery voltage; etc.

Parameters associated with the one or more sensors 126 can be included in a platform domain. Examples of parameters in the platform domain associated with the one or more sensors 126 include: a name of the UE 102; a serial number of UE 102; an elapsed uptime of UE 102; an amount of free memory on UE 102; a total amount of memory on UE 102; an International Mobile Station Equipment Identity (IMEI); an International Mobile Subscriber Identity (IMSI); an indicator of an operating system (OS) on UE 102; a version number of the OS on UE 102; etc.

In FIG. 1B, UE 102 is illustrated as further including an image processor 134 and a camera 136, e.g., a digital camera. A variety of devices (not illustrated) can be mounted to UE 102 by which a given sample of a fluid can be disposed in the optical field of camera 136 and, if needed, illuminated. Such devices are analogous to a stage of a microscope, wherein the stage is configured to receive a sample of fluid pressed between two slides and to dispose the same in the optical field of the microscope. When an image of the given fluid sample is processed by image processor 134 according to appropriate corresponding image-processing software executable thereon (not illustrated), together camera 136 and image processor 134 can function, e.g., as a lens-free digital microscope, which is another type sensor (and is denoted in FIG. 1B as sensor 137). Such a lens-free digital microscope can, for example, analyze: a blood sample to determine red and/or white blood cell counts and/or spot viruses (such as influenza, HIV, etc.); a urine sample to identify indications of dehydration, kidney disease, etc.; a water sample to identify the presence of parasites (e.g., bacteria, etc.), toxic chemicals (e.g., Mercury, etc.), etc.

As noted, UE 102 may include sensors that are discrete external components which are externally coupled to UE 102. For example, UE 102 might be coupled to vital-sign sensors 140 that sense vital signs (e.g., heart rate, respiration rate, blood pressure, body temperature, etc.) of a user (e.g., a warrior, rescuer, etc.) associated with (and on which is borne) UE 102. As a further example, UE 102 might be coupled to one or more sensors 138 that sense conditions to which are exposed UE 102 and the user (e.g., a warrior, rescuer, etc.) associated with (and on which is borne) UE 102, e.g., ambient barometric pressure, ambient temperature, nuclear radiation, chemical agents, electric fields (RF (radio frequency), microwave, etc.), magnetic fields, etc.

The set of domains discussed above can also include domains corresponding to sensors 137-140. More particularly, parameters associated with sensors 137 and 138 can be included in an environment domain. Examples of parameters in the environment domain associated with sensor 124 include: blood red and/or white blood cell counts (relative to a blood sample); flags representing the presence of various viruses, respectively (relative to a blood sample); parameters typically included in a urinalysis (relative to a urine sample); a flag representing the presence of any parasites (relative to a water sample); flags representing the presence of particular parasites (relative to a water sample); etc. Examples of parameters in the environment domain associated with sensor 138 include: ambient temperature; ambient barometric pressure; detected presence of nuclear radiation; cumulative exposure to nuclear radiation, detected presence of one or more chemical agents, detected present of electric fields (RF, microwave, etc.), detected presence of magnetic fields, etc.

Parameters associated with sensor 140 can be included in a user domain. Examples of parameters in the user domain associated with sensor 140 include: a user body temperature; a user pulse rate; a user respiration rate; a user blood oxygen level; a user electrocardiogram (EKG); a user blood cell count; etc.

In FIG. 1B, UE 102 is illustrated as further including: a memory 122 that includes a settings repository. As briefly introduced above (in the discussion of FIG. 1A), according to instances of dynamically reconfigurable criteria 116 and 110, collection engine 114 and omega engine 106 are configured to operate, respectively. Refreshed instances of criteria 110 and 116 (e.g., formatted as one or more XML files) can be included in messages 120. Omega engine 108 is further configured to receive messages 120 during wireless communication sessions 104, respectively, and to store the refreshed instances of reconfigurable criteria 110 and 116 (e.g., formatted as one or more XML files) in settings repository 122. In other words, omega engine 108 is configured to update criteria 110 and 116 with the refreshed instances of criteria 110 and 116.

Figure 1C:
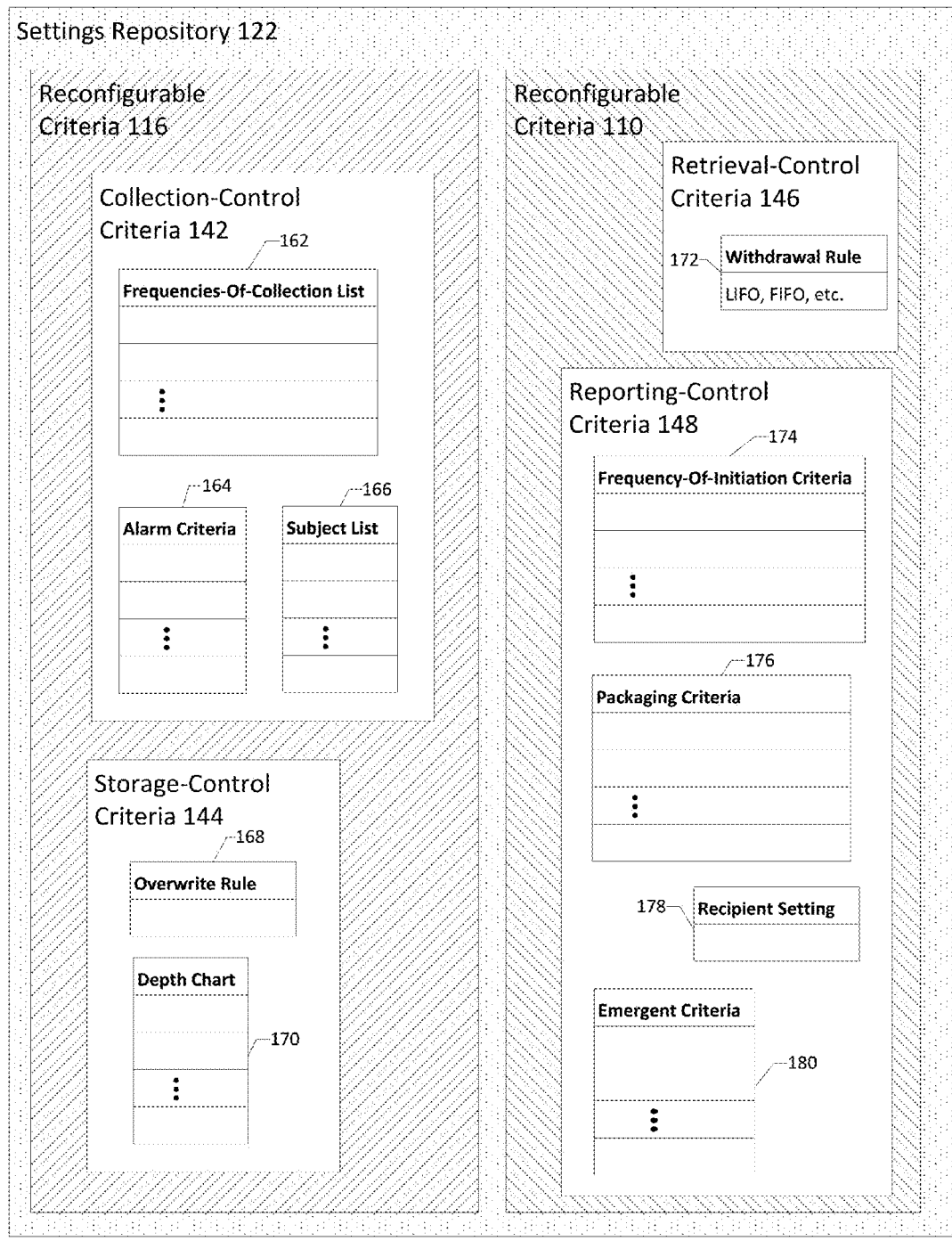
FIG. 1C is a block diagram illustrating examples of criteria that can be stored in the settings repository, according to an embodiment of the present invention.

FIG. 1C is a block diagram illustrating examples of criteria that can be stored in settings repository 122, according to an embodiment of the present invention.

In FIG. 1C, settings repository 122 includes reconfigurable criteria 116 and reconfigurable criteria 110, e.g., represented by one or more XML-formatted files. Criteria 116 can include, e.g., reconfigurable collection-control criteria 142 and reconfigurable storage-control criteria 144. Criteria 110 can include, e.g., reconfigurable retrieval-control criteria 146 and reconfigurable reporting-control criteria 148.

Reconfigurable collection-control criteria 142 can include, e.g., a frequencies-of-collection list 162, alarm criteria 164 and a subject list 166. Reconfigurable storage-control criteria 144 can include, e.g., an overwrite rule 168 and a depth chart 170. Retrieval-control criteria 146 can include, e.g., a withdrawal rule 172. Reporting-control criteria 148 can include, e.g., frequency-of-initiation criteria 174, packaging criteria 176, a recipient setting 178 and emergent criteria 180.

Returning to the discussion of FIG. 1B, as collection engine 114 is configured to operate according to criteria 116, accordingly collection engine 114 is further configured to operate according to collection-control criteria 142 and storage-control criteria 144 (because they are included in criteria 116), which collection engine 114 can read from settings repository 122. If collection engine 114 were to collect data from all of sensors 124-140, the resulting set of data would be a full set of data. Typically, however, collection-control criteria 142 configures collection engine 114 to collect at least some but less than all of the data from sensors 124-140, i.e., a non-empty, proper subset of the full set.

More particularly, subject list 166 (which is included in collection-control criteria 142) defines which ones amongst the various parameters sensed by sensors 124-140 will data representative thereof be collected by collection engine 114. Frequencies-of-collection list 162 (which is included in collection-control criteria 142) defines collection frequencies at which data (representative of parameters sensed by sensors 124-140) is to be collected, respectively, by collection engine 114. In other words, collection engine 114 is further configured to cull such data according to subject list 166 (controls which ones) and frequencies-of-collection list 162 (controls how often).

Subject list 166 can also organize selected ones of the parameters (sensed by sensors 124-140) into groups, respectively. Frequencies-of-collection list 162 indicates the collection frequencies at which data for the groups are to be collected, respectively. Accordingly, collection engine 114, relative to a given one of the groups, is further configured to: cull such data for the selected parameters in the group (as defined by subject list 166) according to the corresponding collection frequency indicated in frequencies-of-collection list 162 so as to produce resulting sets of data for which the data included therein are sampled, e.g., at substantially the same times, respectively.

Memory 112 is of finite storage capacity. If not otherwise constrained, then (over the elapse of a sufficient amount of time) collection engine 114 would be able to accumulate more data, e.g., more instances of each set of data, than could fit in memory 112. To deal with the problem of too much data for too little storage capacity, depth chart 170 and overwrite rule 168 are provided.

Depth chart 170 (which is included in storage-control criteria 144) defines how much data can be accumulated in memory 112 for each of the parameters, respectively. Depth chart 170 can also define how many instances of each set of data can be accumulated in memory 112, the instances of each set being sampled at substantially different times, respectively. According to depth chart 170, collection engine 114 is further configured to accumulate data in memory 112, e.g., instances of each set of data.

Overwrite rule 168 (which is included in storage-control criteria 144) defines how space in memory 112 is to be reused, i.e., how data in memory 112 is to be overwritten. According to overwrite rule 168, collection engine 114 is further configured to overwrite previously-stored instances of data in memory 112 with corresponding newer instances of data. Overwrite rule 168 can be, e.g., FIFO (first in, first out), LIFO (last in, first out), etc.

As also briefly introduced above (in the discussion of FIG. 1A), periodically, omega engine sends the selected portions of collected data in memory 112 to NIB 106. Under unusual circumstances, however, it might be desirable to send data sooner, i.e., to not await elapse of a reporting period. Alternatively, under other unusual circumstances, e.g., it might be desirable to collect more data than is typically collected and/or report more data than is typically reported and/or report the same amount of data that is typically reported albeit at a smaller reporting period.

To facilitate being responsive to such unusual circumstances, alarm criteria 164 can be included in collection-control criteria 142. Examples of alarm criteria include one or more alarm thresholds for the parameters sensed by sensors 124-140, respectively. Collection engine 114 can be further configured to analyze the collected data in memory 112 in terms of alarm criteria 164. If any of alarm criteria 164 are satisfied, then collection engine 114 is further configured to store satisfied ones 165 of alarm criteria 164 in memory 112. According to depth chart 170, collection engine 114 is further configured to accumulate one or more instances of satisfied ones 165 of alarm criteria 164 in memory 112. And according overwrite rule 168, collection engine 114 is further configured to limit, via selective overwriting, previously-stored instances of satisfied ones 165 of alarm criteria 164 that are accumulated in memory 112.

As omega engine 108 is configured to operate according to criteria 110, accordingly omega engine 108 is further configured to operate according to retrieval-control criteria 146 and reporting-control criteria 148 (because they are included in criteria 110), which omega engine 108 can read from settings repository 122.

More particularly, withdrawal rule 172 (which is included in retrieval-control criteria 146) defines which portions of data in memory 112 are to be withdrawn. Withdrawal rule 170 can be, e.g., FIFO (first in, first out), LIFO (last in, first out), etc. Omega engine 108 is further configured to retrieve one or more selected portions 152 of the collected data in memory 112, e.g., one or more of the instances of one or more of the sets of data in memory 112, according to withdrawal rule 172.

As noted, omega engine 106 can send selected portions 152 of the collected data to NIB 106 (via messages 118). Alternatively, the ultimate destination for selected portions 152 of the collected data might not be NIB 106, but instead some other device. For example, where network 100 is an MCN, and the range of network 100 has been extended by networking together NIB 106 and another NIB (not illustrated), then the ultimate destination for selected portions 152 of the collected data might be the other NIB rather than NIB 106. Recipient setting 178 defines which one amongst a plurality of remote hosts (e.g., to continue the example started above, NIB 106 or the other NIB) will receive selected portions 152 of the collected data from omega engine 108.

Frequency-of-initiation criteria 174 (which are included in reporting-control criteria 148) defines a frequency at or period over which omega engine 108 should initiate establishing a communications session 104, e.g., for the purpose of performing one or more tasks, at least one of which is reporting portions of collected data. Omega engine 108 is further configured to initiate establishing communications sessions 104 according to frequency-of-initiation criteria 174.

Packaging criteria 176 (which are included in reporting-control criteria 148) define, e.g., how selected portions 152 of the collected data in memory 112 are to be included in, e.g., formatted into or packaged into, a given instance of message 118. Omega engine 108 is further configured to configure selected portions 152 of the collected data in memory 112 into a message 118 according to packaging criteria 176.

To further facilitate being responsive to the unusual circumstances discussed above, emergent criteria 180 can be provided. Examples of emergent criteria can include rules (logical constructs) related to alarm thresholds that have been exceeded. For example, an emergent criterion can be a combination of one or more alarm thresholds that were exceeded at substantially the same time, e.g., within a given set of data. For another example, an emergent criterion can be a combination of a given alarm threshold that has been exceed at substantially times, e.g., across different sets of data.

Omega engine 108 can be further configured to read satisfied ones 165 of alarm criteria 164 from memory 112, and analyze the same in terms of emergent criteria 180. If any of emergent criteria 180 are satisfied, then omega engine 108 is further configured to notify NIB 106 appropriately. Such appropriate notification can include, e.g., not awaiting the elapse of a reporting period before attempting to report to NIB 106, sending more portions 152 of collected data than are typically sent to NIB 106, etc.

Again, NIB 106 includes an LTE modem (not illustrated) by which to communicate with UE 102 via a wireless communication session 104. Additionally, NIB 106 further includes computing components (not illustrated), e.g., one or more processor units, one or more communications buses, one or more memories, one or more interfaces, etc.

In FIG. 1B, NIB 106 is illustrated as including a alpha engine 154, a request handler 158 and a memory 160. For ease of illustration, communication session 104 is illustrated as terminating in omega engine 108. Alpha engine 108 and request handler 158 can be implemented, e.g., as executable code stored in one or more of the noted (above) albeit not-illustrated memories in NIB 106 and executed by one or more of the noted (above) albeit not-illustrated processor units of NIB 106.

As NIB 106 can receive selected portions 152 of the collected data from different instances of UE 102, accordingly memory 160 is configured to include multiple collections of UE-specific collected data. Alpha engine 154 is configured: to receive selected portions 152 of the collected data (via messages 118); unpack messages 118; and provide portions 156 of the collected data to request handler 158. Portions 156 can be formatted the same as portions 152, or differently. Request handler 158 is configured to store portions 156 into one of the collections of data in memory 160 that is specific to the corresponding given instance of UE 102.

As the circumstances of network 100 change with the elapse of time, the multiple collections of UE-specific collected data in memory 160 correspondingly will evolve in substantially real time and in reflection of the change in circumstances. Alpha engine 154 or a separate analytical unit (not illustrated in FIG. 1B) can be configured to perform one or more analyses at least upon the data stored in memory 160. Such an analytical unit, for example, could be included in NIB 106 and implemented, e.g., as executable code stored in one or more of the noted (above) albeit not-illustrated (in FIG. 1B) memories in NIB 106 and executed by one or more of the noted (above) albeit not-illustrated (in FIG. 1B) processor units of NIB 106.

Relative to the data in memory 160, such analyses can be based upon only the given collection of data that is specific to UE 102, or upon the given collection and one or more ones of other-UE-specific collections of data.

Based upon such analyses, it may be desirable that refreshed instances of criteria 110 and/or 116 be generated, e.g., by alpha engine 154 or the analytical unit. Such instances are described using the adjective "refreshed" because, at the time of their generation, they are newer than the corresponding instances of criteria 110 and/or 116 stored in settings repository 122. In other words, at the time of their generation, refreshed instances of criteria 110 and/or 116 are likely to be better adapted to the circumstances confronting UE 102 than are the corresponding instances of criteria 110 and/or 116 stored in settings repository 122.

Alpha engine 154 is further configured to include the refreshed instances of criteria 110 and/or 116 in messages 120 and then to send messages 120 to UE 102 during wireless communication sessions 104, respectively. Again, omega engine 108 is configured to receive messages 120 and store the refreshed instances of criteria 110 and/or 116 (that were in included in messages 120, respectively) in settings repository 122. As such, UE 102 and the operation thereof are dynamically reconfigurable.

Figure 1D:
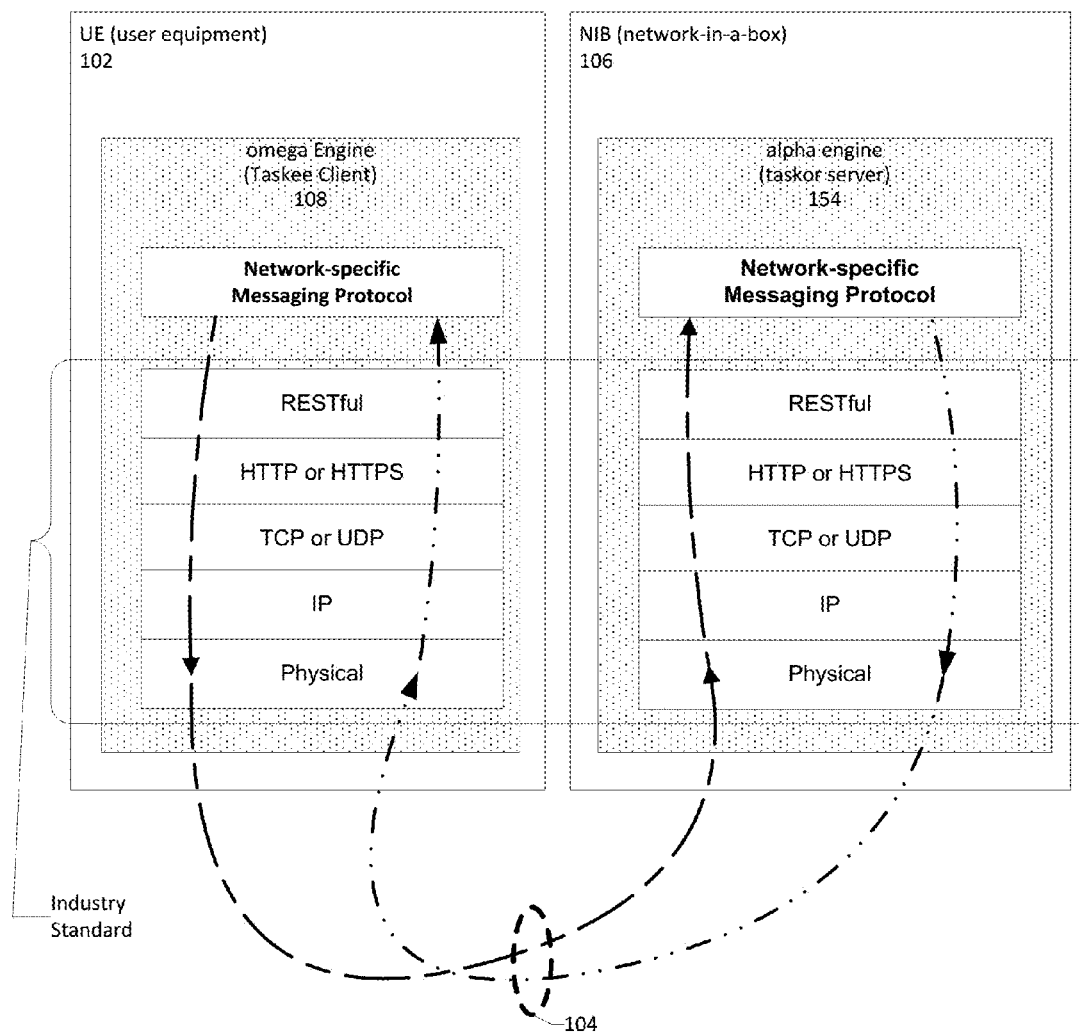
FIG. 1D is a communication-layer diagram illustrating the path of flow during a communication session between the omega engine of the UE and the alpha engine of the NIB, according to an embodiment of the present invention.

FIG. 1D is a communication-layer diagram illustrating the path of flow during communication session 104 between omega engine 108 of UE 102 and alpha engine 154 of NIB 106, according to an embodiment of the present invention.

As noted, omega engine 108 and collection engine 114 can be implemented, e.g., as executable code stored in one or more of the noted (above) albeit not-illustrated memories in UE 102 and executed by one or more of the noted (above) albeit not-illustrated processor units in UE 102. Alpha engine 108 can be implemented, e.g., as executable code stored in one or more of the noted (above) albeit not-illustrated memories in NIB 106 and executed by one or more of the noted (above) albeit not-illustrated processor units of NIB 106. Such implementations can conform to the communication-layer diagram of FIG. 1D.

More particularly, each of omega engine 108 and alpha engine 154 can have a stack based (in part) on industry-standard layers. The layers illustrated in FIG. 1D represent but one example of combinations of layers that can be included in such stacks, respectively. Such layers, from top to bottom, for example (as illustrated in FIG. 1D), can include: a physical layer; an IP layer; a TCP layer or a UDP layer; an HTTP layer or an HTTPS layer; and a RESTful layer. Alternatively, different combinations of layers could be used in the stack. The RESTful layer is a RESTful web service, where REST is the acronym for representational state transfer. RESTful Web services are different than REST per se. REST is an architectural approach that can be applied to many things. RESTful web services are a specific approach to web services that utilizes restful aspects of HTTP.

In addition, the stack of each of omega engine 108 and alpha engine 154 can further include another layer on top of the RESTful layer. For example, the additional layer can be a network-specific messaging protocol that is specific to network 100.

FIGS. 2A-2D are a flowchart, a corresponding Venn diagram and two exemplary frequencies-of-collection lists, respectively, illustrating aspects of operating a mobile parameter-sensing node (e.g., UE 102) connectable via a wireless connection (e.g., wireless communication session 104) to a remote host (e.g., NIB 106), according to an embodiment of the present invention.

Figure 2A:
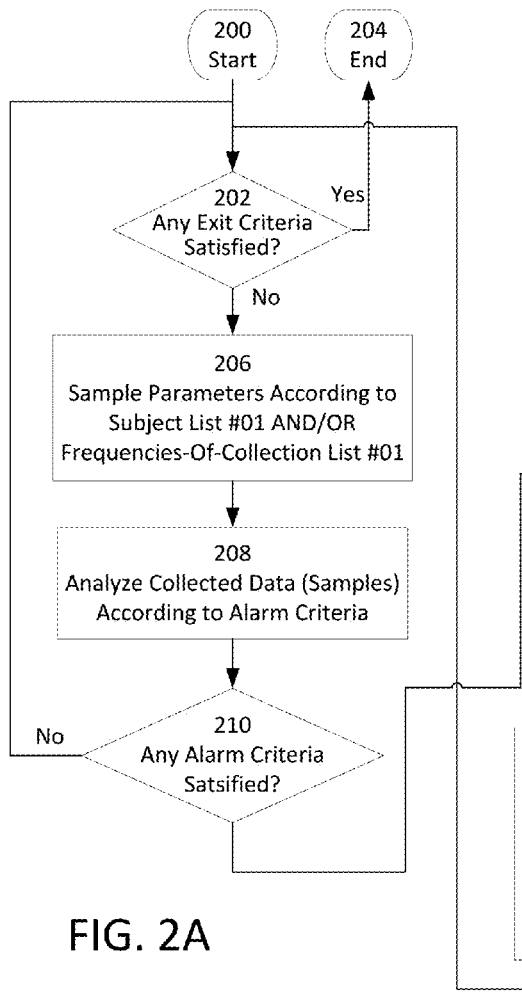
FIGS. 2A-2D are a flowchart, a corresponding Venn diagram and two exemplary frequencies-of-collection lists, respectively, illustrating aspects of operating a mobile parameter-sensing node connectable via a wireless connection to a remote host, according to an embodiment of the present invention.
Figure 2B:
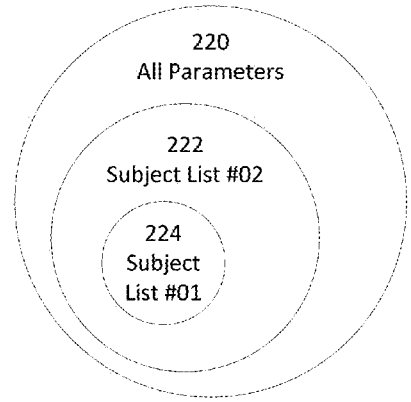

More particularly, FIG. 2A can be regarded as illustrating an example of how to operate one or more of sensors 124-140 and collection engine 114 of UE 102. Overall, the flowchart of FIG. 2A can be regarded as a loop. As a general design consideration, no loop should be infinite, i.e., inescapable. Accordingly, flow in FIG. 2A starts at block 200 and proceeds to decision block 202, where collection engine 114 decides if any exit criteria have been satisfied. If the decision is yes (one or more of the exit criteria are satisfied), then flow proceeds to block 204 and ends. If the decision is no (none of the exit criteria has been satisfied), then flow proceeds to block 206.

At block 206, parameters are sampled (e.g., by one or more of sensors 124-140 and corresponding data are collected by collection engine 114) according to a first subject list and/or a first frequencies-of-collection list. As explained above, a subject list (e.g., subject list 166, which is included in collection-control criteria 142) defines which ones amongst the various parameters sensed by sensors 124-140 will data representative thereof be collected by collection engine 114. And a frequencies-of-collection list (e.g., frequencies-of-collection list 162, which is included in collection-control criteria 142) defines collection frequencies at which data (representative of parameters sensed by sensors 124-140) are to be collected, respectively, by collection engine 114. Flow proceeds from block 206 to block 208.

As explained above, under unusual circumstances, it might be desirable (among other things) to collect more data than is typically collected. One way to respond to unusual conditions by collecting more data is to use alarm criteria, e.g., alarm criteria 154. At block 208, collection engine 114 analyzes the collected data according to one or more alarm criteria. Flow proceeds from block 208 to decision block 210, where collection engine 114 determines if any alarm criteria are satisfied. As such, the collected data is analyzed locally. If the decision is no (none of the alarm criteria has been satisfied), then flow loops back up to decision block 202. If the decision is yes (one or more of the alarm criteria are satisfied), then flow proceeds to block 212, where collection engine 114 stores satisfied ones of the alarm criteria in memory, e.g., memory 112.

To facilitate being responsive to such unusual circumstances, alarm criteria 164 can be included in collection-control criteria 142. Examples of alarm criteria include one or more alarm thresholds for the parameters sensed by sensors 124-140, respectively. Collection engine 114 can be further configured to analyze the collected data in memory 112 in terms of alarm criteria 164. If any of alarm criteria 164 are satisfied, then collection engine 114 is further configured to store satisfied ones 165 of alarm criteria 164 in memory 112. Flow proceeds from block 212 to block 214.

Figure 2C:
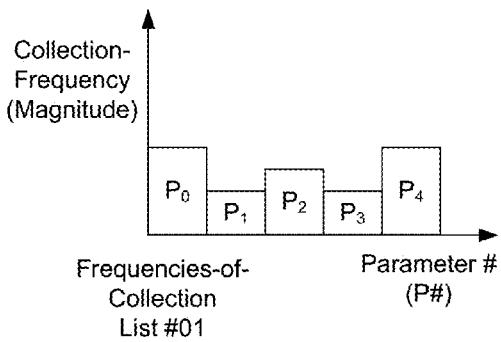
Figure 2D:
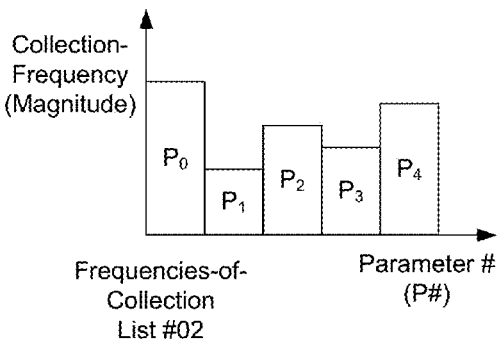

At block 214, because one or more of the alarm criteria are satisfied, parameters are sampled (e.g., by one or more of sensors 124-140 and corresponding data are collected by collection engine 114) according to a second subject list and/or a second frequencies-of-collection list. The second subject list is more inclusive of the parameters than the first subject list, as illustrated in the Venn diagram of FIG. 2B. The second frequencies-of-collection list is more inclusive than the first frequencies-of-collection list. For a set of N parameters, parameters $P_0$-$P_{N-1}$, the magnitude of the frequency-of-collection for at least one parameter $P_i$ (the $i^{th}$ parameter P) is greater in the second frequencies-of-collection list than the first frequencies-of-collection list, as illustrated by the contrast between FIG. 2C and FIG. 2D, i.e., by the contrast between the collection-frequency magnitudes of corresponding parameter numbers (P#) of FIGS. 2C-2D. For simplicity of illustration, only an exemplary five parameters, $P_0$-$P_4$, are illustrated in FIGS. 2C-2D. To restate, more parameters will be sampled according to the second subject list than are sampled according to the first subject list and/or at least some of the data will be collected at higher frequencies according to the second frequencies-of-collection list than according to the first frequencies-of-collection list.

Figure 2E:
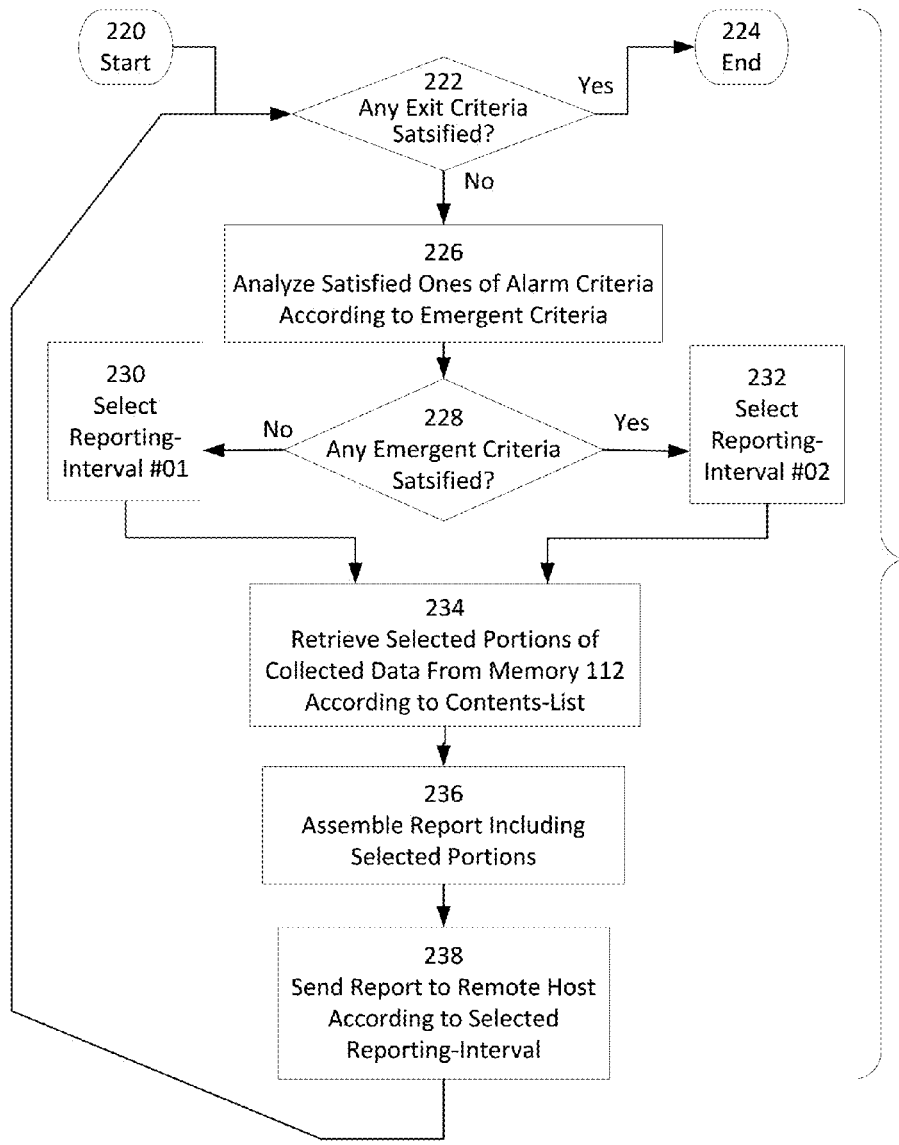
FIGS. 2E-2F are a flowchart and a corresponding interval diagram, respectively, illustrating additional aspects of operating a mobile parameter-sensing node connectable via a wireless connection to a remote host, according to an embodiment of the present invention.
Figure 2F:
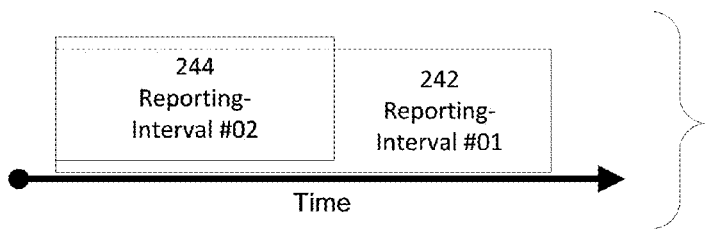

FIGS. 2E-2F are a flowchart and a corresponding interval diagram, respectively, illustrating additional aspects of operating a mobile parameter-sensing node (e.g., UE 102) connectable via a wireless connection (e.g., wireless communication session 104) to a remote host (e.g., NIB 106), according to an embodiment of the present invention.

More particularly, FIG. 2E can regarded as illustrating an example of how to operate omega engine 108 of UE 102. Overall, the flowchart of FIG. 2E can be regarded as a loop. As a general design consideration, no loop should be infinite, i.e., inescapable. Accordingly, flow in FIG. 2E starts at block 220 and proceeds to decision block 222, where omega engine 108 decides if any exit criteria have been satisfied. If the decision is yes (one or more of the exit criteria are satisfied), then flow proceeds to block 224 and ends. If the decision is no (none of the exit criteria has been satisfied), then flow proceeds to block 226.

As explained above, under unusual circumstances, it might be desirable (among other things) to report data more frequently than is typically reported. One way to respond to unusual conditions by reporting data more frequently is to use emergent criteria, e.g., emergent criteria 180. At block 226, omega engine 108 analyzes satisfied ones of the alarm criteria according to one or more emergent criteria. Flow proceeds from block 226 to decision block 228, where omega engine 108 determines if any emergent criteria are satisfied. As such, the satisfied ones of the alarm criteria are analyzed locally. If the decision is no (none of the emergent criteria has been satisfied), then flow proceeds to block 230, where omega engine 108 selects a first reporting-interval. If the decision is yes (one or more of the emergent criteria are satisfied), then flow proceeds to block 232, where omega engine 108 selects a second reporting-interval. The second reporting interval is smaller than the first reporting interval, as illustrated in time-interval diagram of FIG. 2F. As such, omega engine 108 reports more frequently according to the second reporting-interval than according to the first reporting-interval. From each of blocks 230 and 232, flow proceeds to block 234.

At block 234, omega engine 108 retrieves selected portions of the collected data from memory 112 according to a contents-list (which is included, e.g., in packaging criteria 176). As explained above, packaging criteria 176 (which are included in reporting-control criteria 148) define, e.g., how selected portions 152 of the collected data in memory 112 are to be included in, e.g., formatted into or packaged into, a given instance of message 118. Packaging criteria 176 can also include one or more contents-lists, each list defining portions of the collected data that are to be retrieved for inclusion in a report (e.g., message 118) that will be sent by omega engine 108, e.g., to alpha engine 154 of NIB 106. Omega engine 108 is further configured to retrieve selected portions 152 of the collected data from memory 112 for inclusion in a message 118 according to the one or more contents-lists (which are included in packaging criteria 176). Flow proceeds from block 234 to block 236.

At block 236, omega engine 208 assembles the report (e.g., message 118) including the selected portions of the collected data. Flow proceeds from block 236 to block 238, where omega engine 108 sends the report, e.g., to alpha engine 154 of NIB 106, according to the selected reporting-interval. Flow proceeds from block 238 back up to block 222.

Figures 2G, 2H:
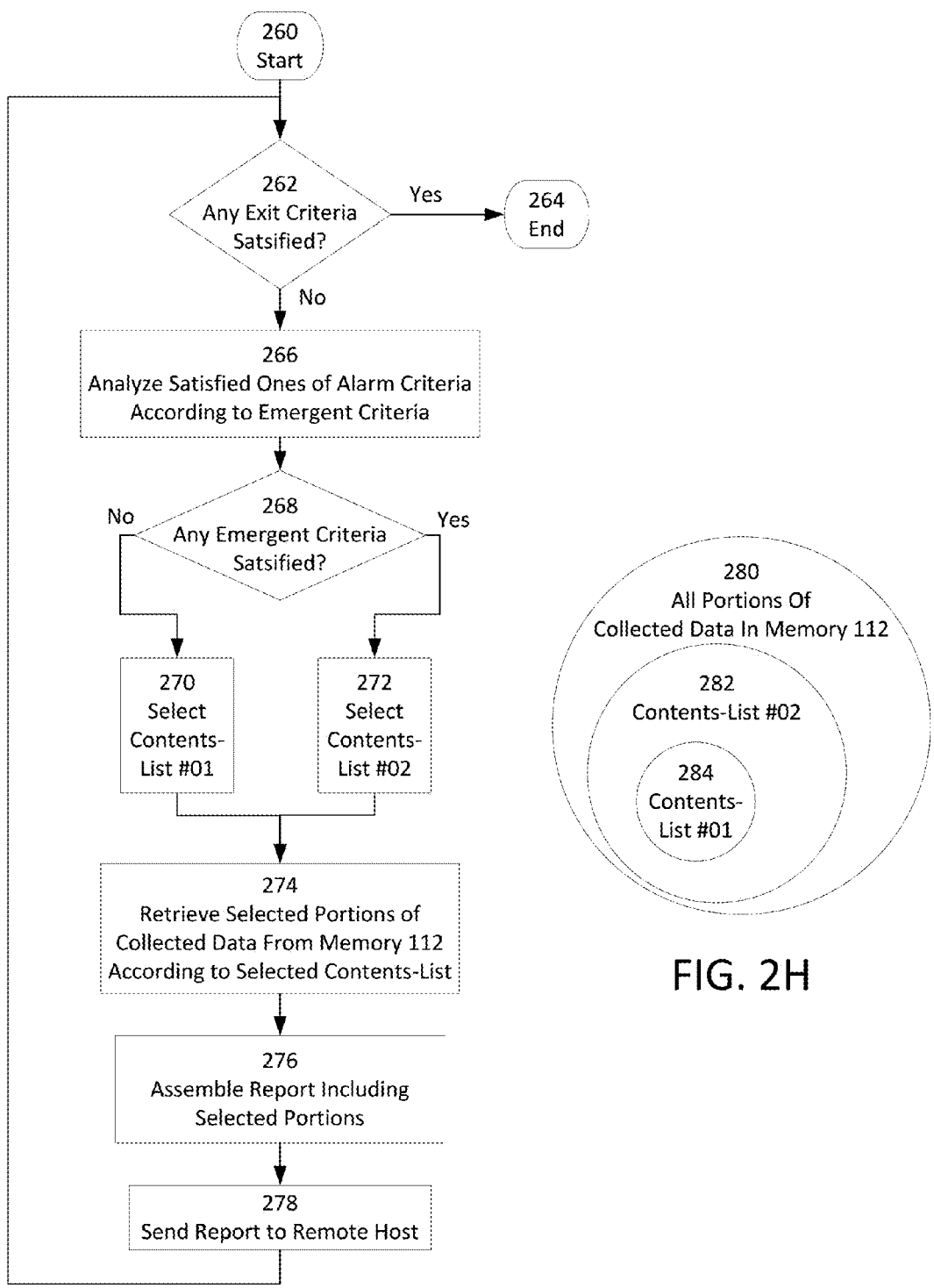
FIGS. 2G-2H are a flowchart and a corresponding Venn diagram, respectively, illustrating additional aspects of operating a mobile parameter-sensing node connectable via a wireless connection to a remote host, according to an embodiment of the present invention.

FIGS. 2G-2H are a flowchart and a corresponding Venn diagram, respectively, illustrating additional aspects of operating a mobile parameter-sensing node (e.g., UE 102) connectable via a wireless connection (e.g., wireless communication session 104) to a remote host (e.g., NIB 106), according to an embodiment of the present invention.

More particularly, FIG. 2G can be regarded as illustrating another example of how to operate omega engine 108 of UE 102. Overall, the flowchart of FIG. 2G can be regarded as a loop. As a general design consideration, no loop should be infinite, i.e., inescapable. Accordingly, flow in FIG. 2G starts at block 260 and proceeds to decision block 262, where omega engine 108 decides if any exit criteria have been satisfied. If the decision is yes (one or more of the exit criteria are satisfied), then flow proceeds to block 264 and ends. If the decision is no (none of the exit criteria has been satisfied), then flow proceeds to block 266.

As explained above, under unusual circumstances, it might be desirable (among other things) to report more data than is typically reported. One way to respond to unusual conditions by reporting more data is to use emergent criteria, e.g., emergent criteria 180. At block 266, omega engine 108 analyzes satisfied ones of the alarm criteria according to one or more emergent criteria. Flow proceeds from block 266 to decision block 268, where omega engine 108 determines if any emergent criteria are satisfied. If the decision is no (none of the emergent criteria has been satisfied), then flow proceeds to block 270, where omega engine 108 selects a first contents-list. If the decision is yes (one or more of the emergent criteria have been satisfied), then flow proceeds to block 272, where omega engine 108 selects a second contents-list. The second contents-list is more inclusive than the first contents-list, as illustrated in the Venn diagram of FIG. 2H. As such, omega engine 108 selects more portions (and/or portions that are larger) according to the second contents-list than according to the first contents-list.

Also as explained above, contents-lists can be included in packaging criteria 176 (which are themselves included in reporting-control criteria 148). Again, a contents-list defines portions of the collected data that are to be retrieved for inclusion in a report (e.g., message 118) that will be sent by omega engine 108, e.g., to alpha engine 154 of NIB 106. And, again, omega engine 108 is further configured to retrieve selected portions 152 of the collected data from memory 112 for inclusion in a message 118 according to the one or more contents-lists (which are included in packaging criteria 176). From each of blocks 270 and 272, flow proceeds to block 274.

At block 274, omega engine 108 retrieves selected portions of the collected data from memory 112 according to the selected contents-list. Flow proceeds from block 274 to block 276. At block 276, omega engine 208 assembles the report (e.g., message 118) including the selected portions of the collected data. Flow proceeds from block 276 to block 278, where omega engine 108 sends the report, e.g., to alpha engine 154 of NIB 106. Flow proceeds from block 278 back up to block 222.

Figure 3A:
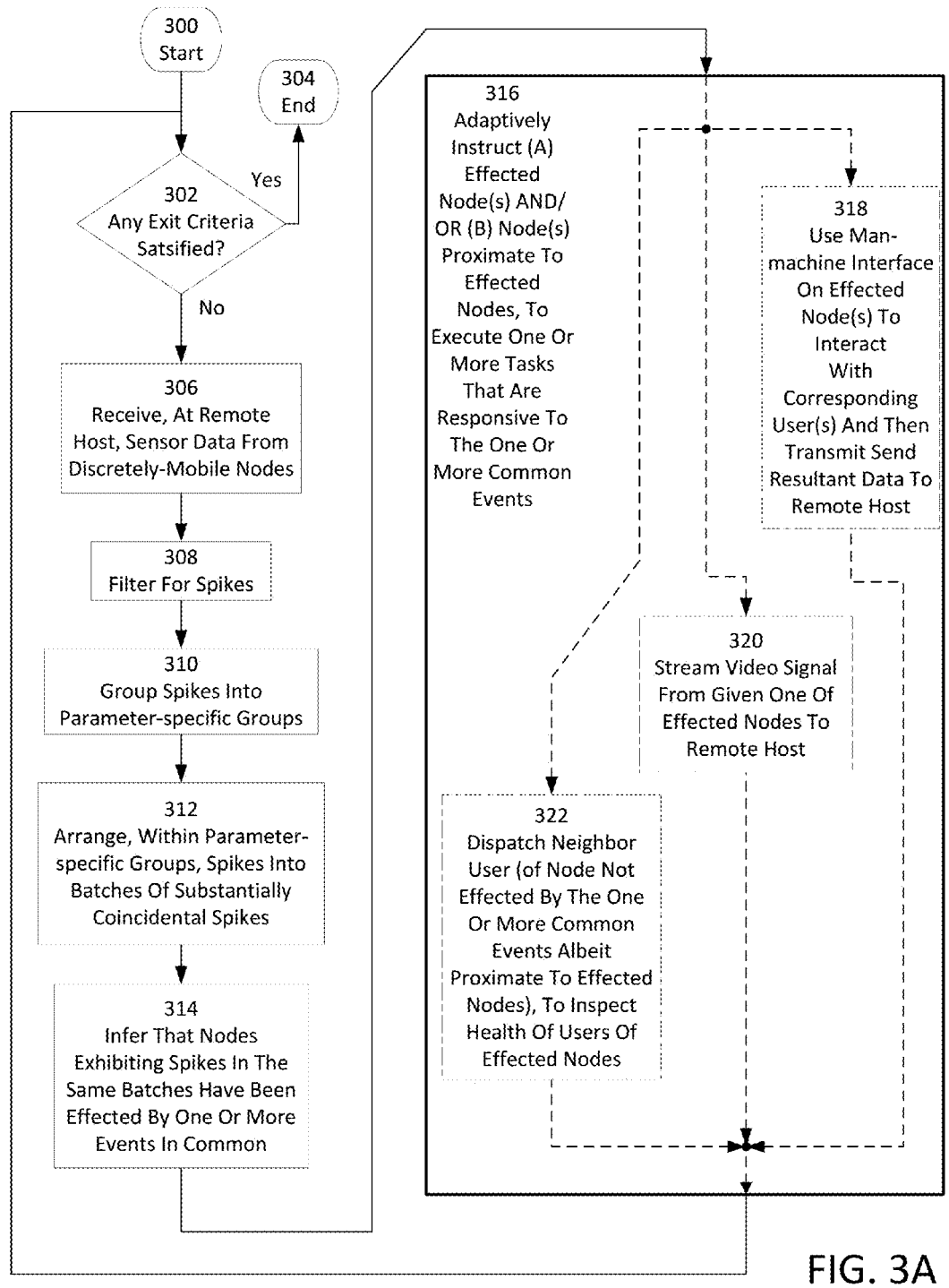
FIG. 3A is a flowchart illustrating aspects of operating a remote host that is connectable via a wireless connection to multiple mobile parameter-sensing nodes, according to an embodiment of the present invention.

FIG. 3A is a flowchart illustrating aspects of operating a remote host (e.g., NIB 106) that is connectable via a wireless connection (e.g., wireless communication session 104) to multiple mobile parameter-sensing nodes (e.g., UEs 102), according to an embodiment of the present invention.

More particularly, FIG. 3A can be regarded as illustrating an example of how to operate alpha engine 154 of UE 102 or a separate analytical unit of UE 102 (not illustrated). Either alpha engine 154 or the separate analytical unit can be configured to perform one or more analyses at least upon the data stored in memory 160. Such an analytical unit, for example, could be included in NIB 106 and implemented, e.g., as executable code stored in one or more of the noted (above) albeit not-illustrated memories in NIB 106 and executed by one or more of the noted (above) albeit not-illustrated processor units of NIB 106. Relative to the data in memory 160, such analyses can be based upon only the given collection of data that is specific to UE 102, or upon the given collection and one or more ones of other-UE-specific collections of data.

Overall, the flowchart of FIG. 3A can be regarded as a loop. As a general design consideration, no loop should be infinite, i.e., inescapable. Accordingly, flow in FIG. 3A starts at block 300 and proceeds to decision block 302, where alpha engine 154 decides if any exit criteria have been satisfied. If the decision is yes (one or more of the exit criteria are satisfied), then flow proceeds to block 304 and ends. If the decision is no (none of the exit criteria has been satisfied), then flow proceeds to block 306.

At block 306, alpha engine receives collected (sensor) data from multiple discretely-mobile nodes, e.g., instances of UE 102. Such nodes can be borne by users, e.g., warriors in a war zone context, rescuers in the context of a disaster-response scenario, etc. The collected data can include acceleration data regarding accelerations undergone by the nodes, and thus undergone by the users on whom the nodes are borne, respectively. Flow proceeds from block 306 to block 308.

At block 308, alpha engine 154 filters the collected data for spikes. Flow proceeds from block 308 to block 310, where alpha engine 154 groups the spikes into parameter-specific groups. In other words, spikes associated with a first parameter are placed in a first group, spikes associated with a second parameter are placed in a second group, etc. Flow proceeds from block 310 to block 312, where alpha engine 154 arranges, within the parameter-specific groups, the spikes therein into batches of substantially coincidental spikes. For example, within a group of spikes that are specific to a given acceleration parameter, spikes from different nodes may be present. At block 312, the spikes from the different nodes would be arranged into batches such that, within each batch, the spikes would be substantially coincidental. Flow proceeds from block 312 to block 314.

At block 314, alpha engine 154 infers that nodes which exhibit spikes in the same batches have been effected by one or more events in common. To continue the example (of the acceleration-parameter-specific group of spikes), if there are first and second batches of spikes therein, then alpha engine 154 would infer that nodes which exhibit spikes in the first batch were effected by a common event and that nodes which exhibit spikes in the first batch were effected by a common event.

To further expand the example of the acceleration-parameter-specific group of spikes, if it is assumed (1) that there are numerous batches, (2) that spikes in the numerous batches correspond to substantially overlapping sets of nodes, respectively, (3) the spikes within a given batch are from different nodes but are substantially coincidental and (4) the batches (i.e., the respective arrangements of coincidental spikes) occur at substantially different times within an interval, then alpha engine 154 would infer from the batches that the nodes corresponding to the batches were subjected to bombardment during the interval.

From block 314, flow proceeds to block 316, where alpha engine 154 adaptively instructs (A) at least one of the effected nodes and/or (B) at least one node proximate to the effected nodes to execute one or more tasks that are responsive to the one or more common events, respectively. From block 316, flow proceeds back to block 302.

For example, tasks that are responsive to the one or more common events can include one or more of: a first task of using a man-machine interface on a given one of the effected nodes to interact with the corresponding user thereof and to transmit resultant data back to alpha engine 154 (as illustrated by optional block 318 within block 316); a second task of streaming a video signal as resultant data from an effected node(s) to alpha engine 154 (as illustrated by optional block 320 within block 316); a third task of dispatching a neighbor user (of a node not effected by the one or more common events albeit proximate to the effected nodes) to inspect the health of users of the effected nodes, respectively (as illustrated by optional block 322 within block 316). As blocks 318-322 are optional, they are illustrated in broken lines in FIG. 3A. Alpha engine 154 might, for example, initially instruct the execution of the tasks of optional block 318 and/or 320, receive the resultant data, respectively, and then determine whether to instruct the execution of optional block 322 based on the analysis of the resultant data.

To identify tasks that are responsive to the one or more common events, omega engine 154 can, e.g., compare a set of reference thresholds representing escalating human-physiology danger levels against each of the acceleration spikes, respectively, to determine a corresponding danger level. Based on the identified danger level, omega engine 154 can determine, for each node, one or more tasks that are appropriate to the corresponding danger level.

Figure 3B:
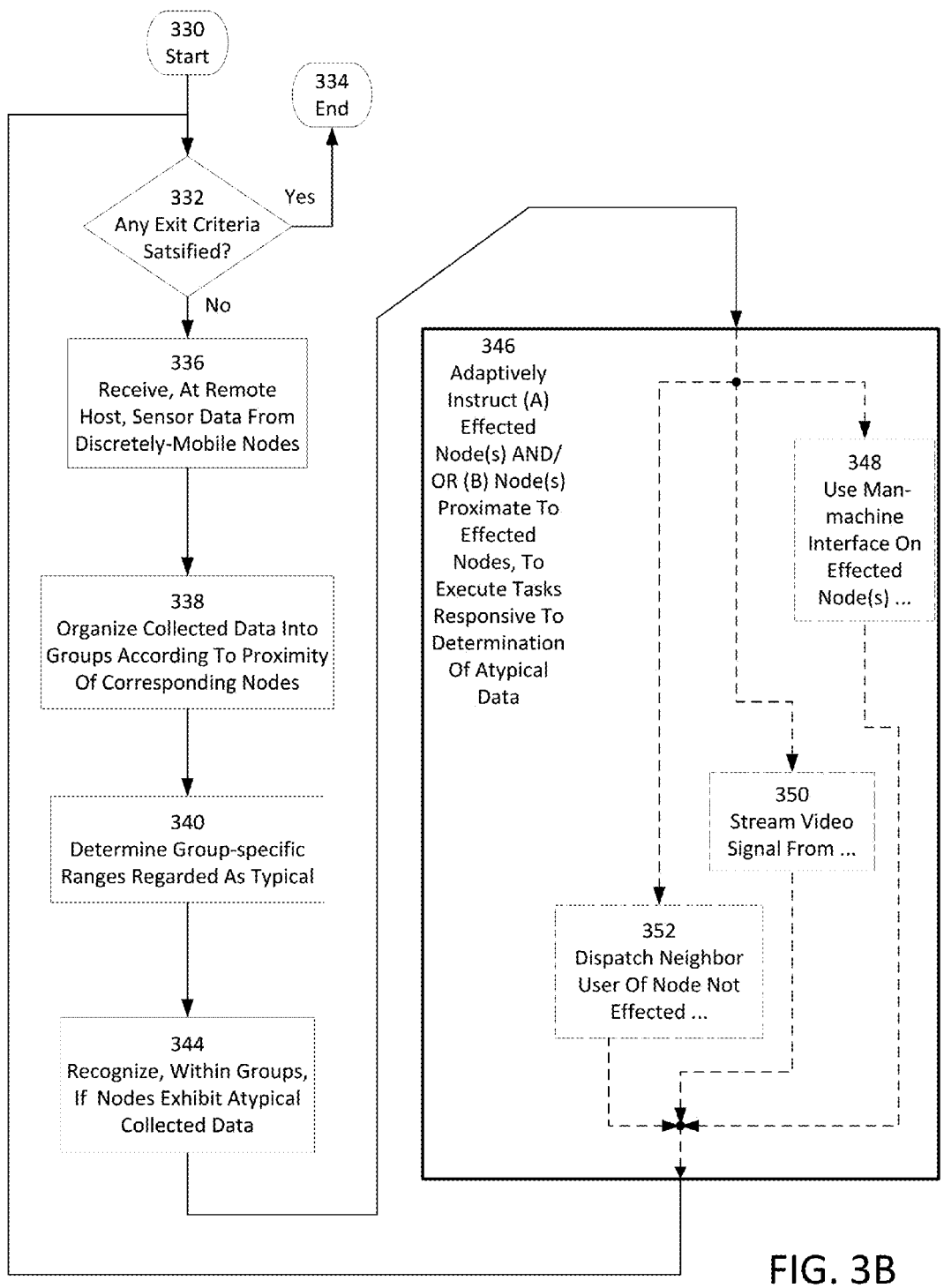
FIG. 3B is a flowchart illustrating additional aspects of operating a remote host that is connectable via a wireless connection to multiple mobile parameter-sensing nodes, according to an embodiment of the present invention.

FIG. 3B is a flowchart illustrating additional aspects of operating a remote host (e.g., NIB 106) that is connectable via a wireless connection (e.g., wireless communication session 104) to multiple mobile parameter-sensing nodes (e.g., UEs 102), according to an embodiment of the present invention.

More particularly, FIG. 3B can regarded as illustrating an example of how to operate alpha engine 154 of UE 102 or the separate analytical unit of UE 102 (discussed above albeit not illustrated).

Overall, the flowchart of FIG. 3B can be regarded as a loop. As a general design consideration, no loop should be infinite, i.e., inescapable. Accordingly, flow in FIG. 3B starts at block 330 and proceeds to decision block 332, where alpha engine 154 decides if any exit criteria have been satisfied. If the decision is yes (one or more of the exit criteria are satisfied), then flow proceeds to block 334 and ends. If the decision is no (none of the exit criteria has been satisfied), then flow proceeds to block 336.

At block 336, alpha engine receives collected (sensor) data from multiple discretely-mobile nodes, e.g., instances of UE 102. Such nodes can be borne by users, e.g., warriors in a war zone context, rescuers in the context of a disaster-response scenario, etc. The collected data can include acceleration data regarding accelerations undergone by the nodes, and thus undergone by the users on whom the nodes are borne, respectively. Flow proceeds from block 336 to block 338.

At block 338, alpha engine 154 organizes the data into groups according to the proximities of the corresponding nodes to one another. For example, in the context of users that are warriors in a war zone, such groups might correspond in size to a squad and/or a platoon. From block 338, flow proceeds to block 340, where (for each group) alpha engine 154 determines parameter-specific ranges of values based on the corresponding data ranges that would be regarded as typical ranges of values for the corresponding parameter. From block 340, flow proceeds to block 344, where alpha engine 154 recognizes (within each group) if there are one or more nodes exhibiting atypical collected data. From block 344 flow proceeds to block 346, where alpha engine 154 adaptively instructs, within each group, at least one of the nodes to execute one or more tasks that are responsive to the determination of atypical data. From block 346, flow proceeds back to block 332.

For example, tasks that are responsive to the one or more common events can include one or more of: a first task as illustrated by optional block 348; a second task as illustrated by optional block 320; and a third task as illustrated by optional block 322. Blocks 348-352 correspond to blocks 318-322, respectively. For the sake of brevity, and in light of the noted correspondence, little in the way of further discussion of blocks 348-352 is provided. Alpha engine 154 might, for example, initially instruct the execution of the tasks of optional block 348 and/or 350, receive the resultant data, respectively, and then determine whether to instruct the execution of the task of optional block 352 based on the analysis of the resultant data.

To identify tasks that are responsive to the determination of atypical data, omega engine 154 can, e.g., compare a set of reference thresholds representing escalating human-physiology danger levels against each of the acceleration spikes, respectively, to determine a corresponding danger level. Based on the identified danger level, omega engine 154 can determine, for each node, one or more tasks that are appropriate to the corresponding danger level.

Figure 3C:
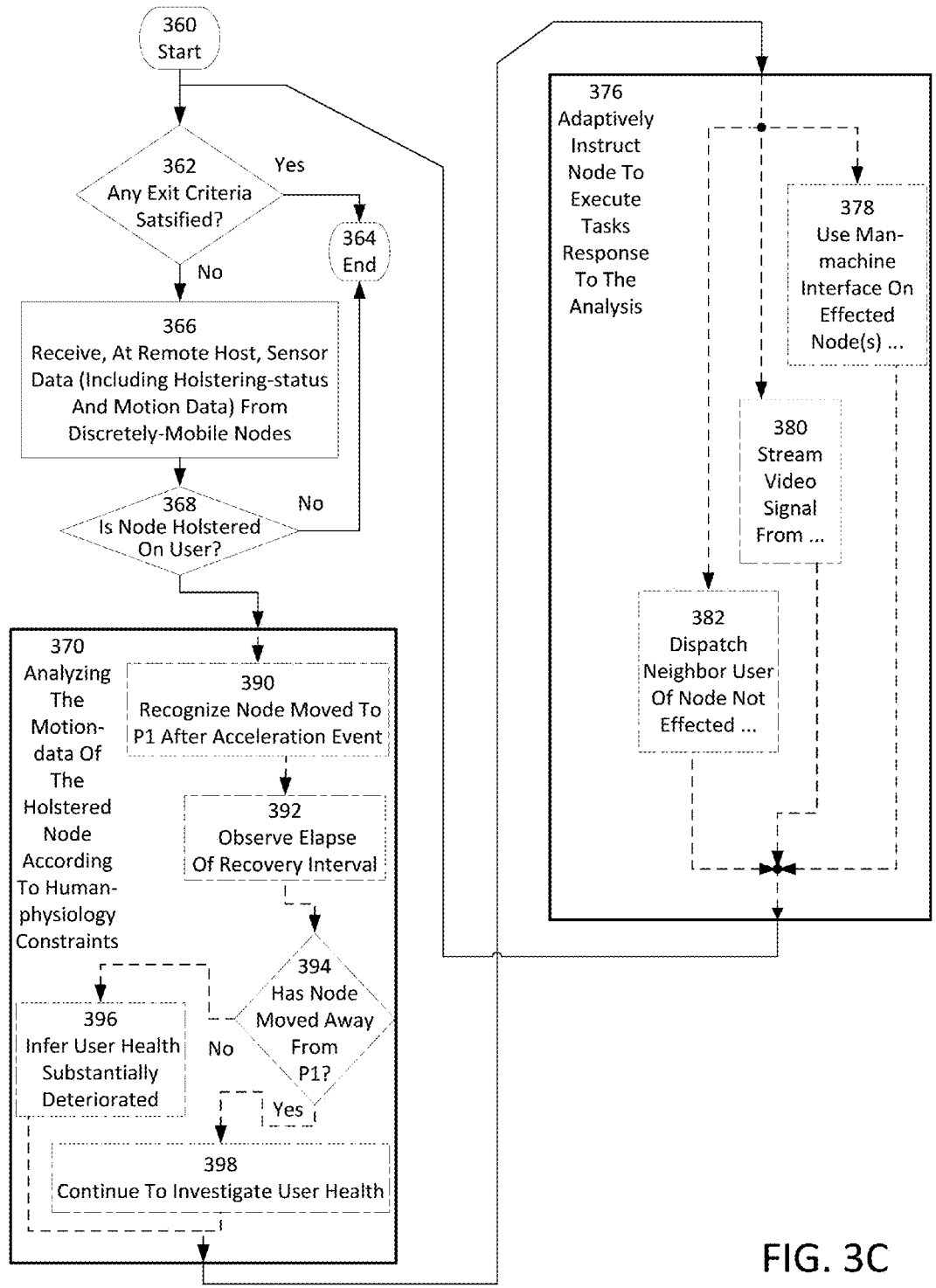
FIG. 3C is a flowchart illustrating additional aspects of operating a remote host that is connectable via a wireless connection to a mobile parameter-sensing node, of which multiple ones thereof can be connected to NIB 106), according to an embodiment of the present invention.

FIG. 3C is a flowchart illustrating additional aspects of operating a remote host (e.g., NIB 106) that is connectable via a wireless connection (e.g., wireless communication session 104) to a mobile parameter-sensing node (e.g., UE 102), of which multiple ones thereof can be connected to NIB 106), according to an embodiment of the present invention.

More particularly, FIG. 3C can regarded as illustrating an example of how to operate alpha engine 154 of UE 102 or the separate analytical unit of UE 102 (discussed above albeit not illustrated).

Overall, the flowchart of FIG. 3C can be regarded as a loop. As a general design consideration, no loop should be infinite, i.e., inescapable. Accordingly, flow in FIG. 3C starts at block 360 and proceeds to decision block 362, where alpha engine 154 decides if any exit criteria have been satisfied. If the decision is yes (one or more of the exit criteria are satisfied), then flow proceeds to block 364 and ends. If the decision is no (none of the exit criteria has been satisfied), then flow proceeds to block 366.

At block 366, alpha engine receives collected (sensor) data from one of the discretely-mobile nodes, e.g., an instance of UE 102. Such nodes can be borne by users, e.g., warriors in a war zone context, rescuers in the context of a disaster-response scenario, etc. More particularly, rather that occupy a hand in order to hold the nodes, e.g., warriors in warriors in a war zone context and rescuers in the context of a disaster-response scenario typically wear holsters for the nodes (and elect to holster the nodes therein).

The collected data can include motion data (e.g., acceleration data, position data, etc.) regarding motion undergone by the nodes. When the nodes are holstered, it is reasonable to regard the motion undergone by the nodes as having been undergone by the users on whom the nodes are borne, respectively. Accordingly, the collected data can further include the holstering-statuses of the nodes, respectively. That is, the holstering status, e.g., a flag in memory, is an indication of whether the node is in a state of being holstered (i.e., disposed in the holster) or in a state of being out the holster. Flow proceeds from block 366 to decision block 368.

At decision block 368, alpha engine 154 decides if the node is holstered. If the decision is no (the node is not holstered), then flow proceeds to block 364 and ends. If the decision is yes (the node is holstered), then flow proceeds to block 370.

At block 370, alpha engine 154 analyzes the motion data of the holstered node according, e.g., to human-physiology constraints. For example, alpha engine 154 can compare a set of reference thresholds representing escalating human-physiology danger levels against the acceleration data, respectively, to determine a corresponding danger level.

Also at block 370, alpha engine 154 can execute optional blocks 390-398. Flow entering block 370 can proceed to optional block 390, where alpha engine 154 recognizes that the node moved to a position, P1, after it underwent an acceleration event. Flow proceeds from optional block 390 to optional block 392, where alpha engine 154 analyzes data sampled during the elapse of a recovery interval in which a typical user might be expected to recover from an acceleration event. Flow proceeds from optional block 392 to optional decision block 394, where alpha engine 154 decides if the node has moved a non-negligible distance away from position P1, e.g., to another position, P2, that is a significant distance away from P1. In other words, alpha engine 154 decides if the node has undergone substantially no motion relative to position P1.

If the decision at optional decision block 394 is no (the node has not moved away from position P1), then flow proceeds to optional block 396, where alpha engine 154 infers that the health of the node's user is substantially deteriorated. From optional block 396, flow can exit block 370 and proceed to block 376.

If the decision at optional decision block 394 is yes (the node has moved a significant distance away from position P1), then flow can proceed to optional block 398, where alpha engine 154 continues to investigate the health of the node's user. From optional block 398, flow also can exit block 370 and proceed to block 376.

At block 376, alpha engine 154 adaptively instructs the node to execute one or more tasks that are responsive to the analysis of block 470. From block 376, flow proceeds back to block 362. For example, tasks that are responsive to the analysis of block 370 can include one or more of: a first task as illustrated by optional block 378; a second task as illustrated by optional block 380; and a third task as illustrated by optional block 382. Blocks 378-382 correspond to blocks 318-322, respectively. For the sake of brevity, and in light of the noted correspondence, little in the way of further discussion of blocks 378-382 is provided. Alpha engine 154 might, for example, initially instruct the execution of the tasks of optional block 378 and/or 380, receive the resultant data, respectively, and then determine whether to instruct the execution of the task of optional block 382 based on the analysis of the resultant data.

To identify tasks that are responsive to the analysis of block 370, omega engine 154 can, e.g., compare a set of reference thresholds representing escalating human-physiology danger levels against each of the acceleration spikes, respectively, to determine a corresponding danger level. Based on the identified danger level, omega engine 154 can determine, for each node, one or more tasks that are appropriate to the corresponding danger level.

As will be discussed in terms of FIGS. 4-6, omega engine 108 and alpha engine 154 exhibit a client-server relationship. More particularly, omega engine 108 and alpha engine 154 exhibit a specific type of client-server relationship, namely a taskee-client-taskor-server, i.e., they relate as taskee-client and taskor-server, respectively. Omega engine 108 is a client that requests alpha engine 154 to serve tasks to it, i.e., to provide it with tasks which either omega engine 108, collection engine 114 or another component of UE 102 will perform. As such, omega engine 108 is a taskee; hence omega engine 108 is referred to as a taskee-client. As the entity that assigns tasks to another entity, i.e., that is a taskor, alpha engine 154 is referred to as a taskor-server.

As a taskee-client, omega engine 108 is further configured to: query the taskor server (alpha engine 154) for an unspecified one amongst a plurality of predetermined tasks, with a consequent selection of a given one from amongst the plurality tasks being an action performed by the taskor-server (alpha engine 154); receive an indication of the given task from the taskor-server (alpha engine 154); facilitate execution of the given task on UE 102, e.g., via collection engine 114; and report execution-results of the given task to the taskor-server (alpha engine 154).

As a taskor-server, alpha engine 154 is further configured to: receive a query from the taskee-client (omega engine 108) for an unspecified one amongst the plurality of tasks; make a selection of a given one from amongst the plurality of predetermined tasks; indicate the selected task to the taskee-client (omega engine 108); and receive a report including execution results for the selected task from the taskee-client (omega engine 108).

Figure 4:
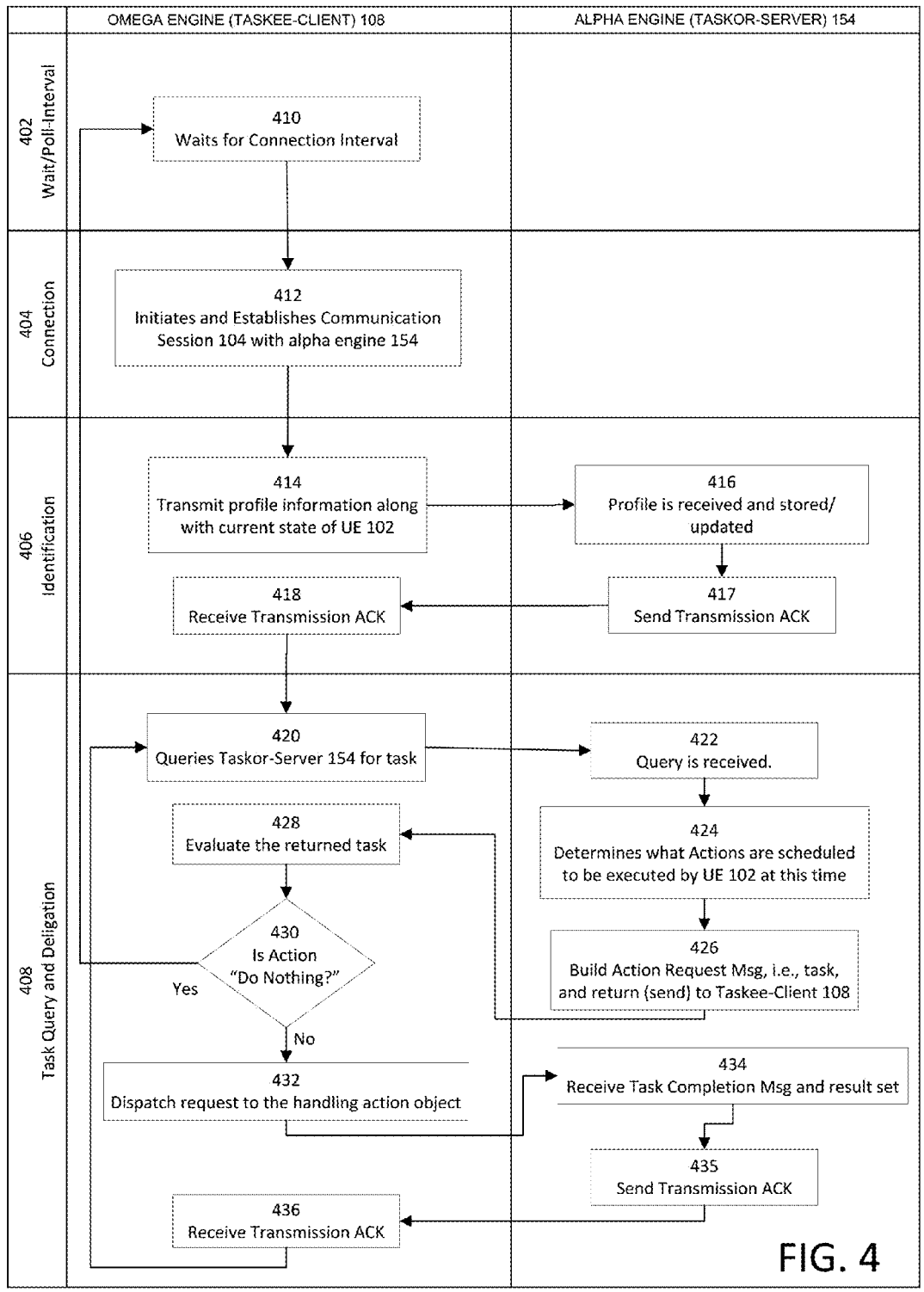
FIG. 4 is a flow diagram of interactions that can occur in a taskee-client-taskor-server relationship, according to an embodiment of the present invention.

FIG. 4 is a flow diagram of interactions that can occur in a taskee-client-taskor-server relationship, according to an embodiment of the present invention.

In FIG. 4, flow proceeds through four phases: a wait/poll-interval phase 402; a connection phase 404; an identification phase 406; and a task query and delegation phase 408. Beginning with wait/poll-interval phase 402, at block 410, the taskee-client (omega engine 108) waits while a connection interval elapses. Flow proceeds from block 410 to block 412, thereby entering connection phase 404. At block 412, the taskee-client (omega engine 108) initiates and establishes a communication session 104 with the taskor-server (alpha engine 154).

Flow proceeds from block 412 to block 414, thereby entering identification phase 406. At block 414, the taskee-client (omega engine 108) transmits profile information and a current state of UE 102 to the taskor-server (alpha engine 154). Flow proceeds from block 414 to block 416, where the taskor-server (alpha engine 154) receives the profile and current state information regarding taskee-client (omega engine 108), and stores the same in memory, e.g., memory 160. Flow proceeds from block 416 to block 417, where the taskor-server (alpha engine 154) sends a transmission acknowledgment (ACK) to the taskee-client (omega engine 108). Flow proceeds from block 417 to block 418, where the taskee-client (omega engine 108) receives the transmission acknowledgment (ACK) from the taskor-server (alpha engine 154).

Flow proceeds from block 418 to block 420, thereby entering task query and delegation phase 408. At block 418, the taskee-client (omega engine 108) queries the taskor-server (alpha engine 154) for an unspecified one amongst a plurality of predetermined tasks. Flow proceeds from block 420 to block 422, where the taskor-server (alpha engine 154) receives the query. Flow proceeds from block 422 to block 424, where the taskor-server (alpha engine 154) determines what actions should be executed (e.g., are scheduled to be executed and/or are desirable under the current circumstances) by UE 102 at this time. Flow proceeds from block 424 to block 426, where the taskor-server (alpha engine 154) builds an action request message, i.e., a task, and returns (sends) the task to the taskee-client (omega engine 108). Flow proceeds from block 426 to block 428, where the taskee-client (omega engine 108) evaluates the task for which it is the taskee.

Flow proceeds from block 428 to decision block 430, where the taskee-client (omega engine 108) decides if the appropriate action for execution of the task is to do nothing. If the outcome of decision block 430 is yes, then flow proceeds from decision block 430 and loops back to block 410, thereby reentering wait/poll-interval phase 402. But if the outcome of decision block 430 is no, then flow proceeds from decision block 430 to block 432, where the taskee-client (omega engine 108) dispatches one or more requests to one or more amongst a plurality of handling objects on UE 102 that are appropriate for carrying out the execution of the task. Upon completion of the task by the one or more handling objects, the taskee-client (omega engine 108) sends a task-completion message, including a set of results (if any), to the taskor-server (alpha engine 154). Flow proceeds from block 432 to block 434, where the taskor-server (alpha engine 154) receives the task-completion message including the set of results (if any).

Flow proceeds from block 434 to block 435, where the taskor-server (alpha engine 154) sends a transmission acknowledgment (ACK) to the taskee-client (omega engine 108). Flow proceeds from block 434 to block 436, where the taskee-client (omega engine 108) receives the transmission acknowledgment (ACK) from the taskor-server (alpha engine 154). Flow proceeds from block 436 and loops back to block 420.

Figure 5:
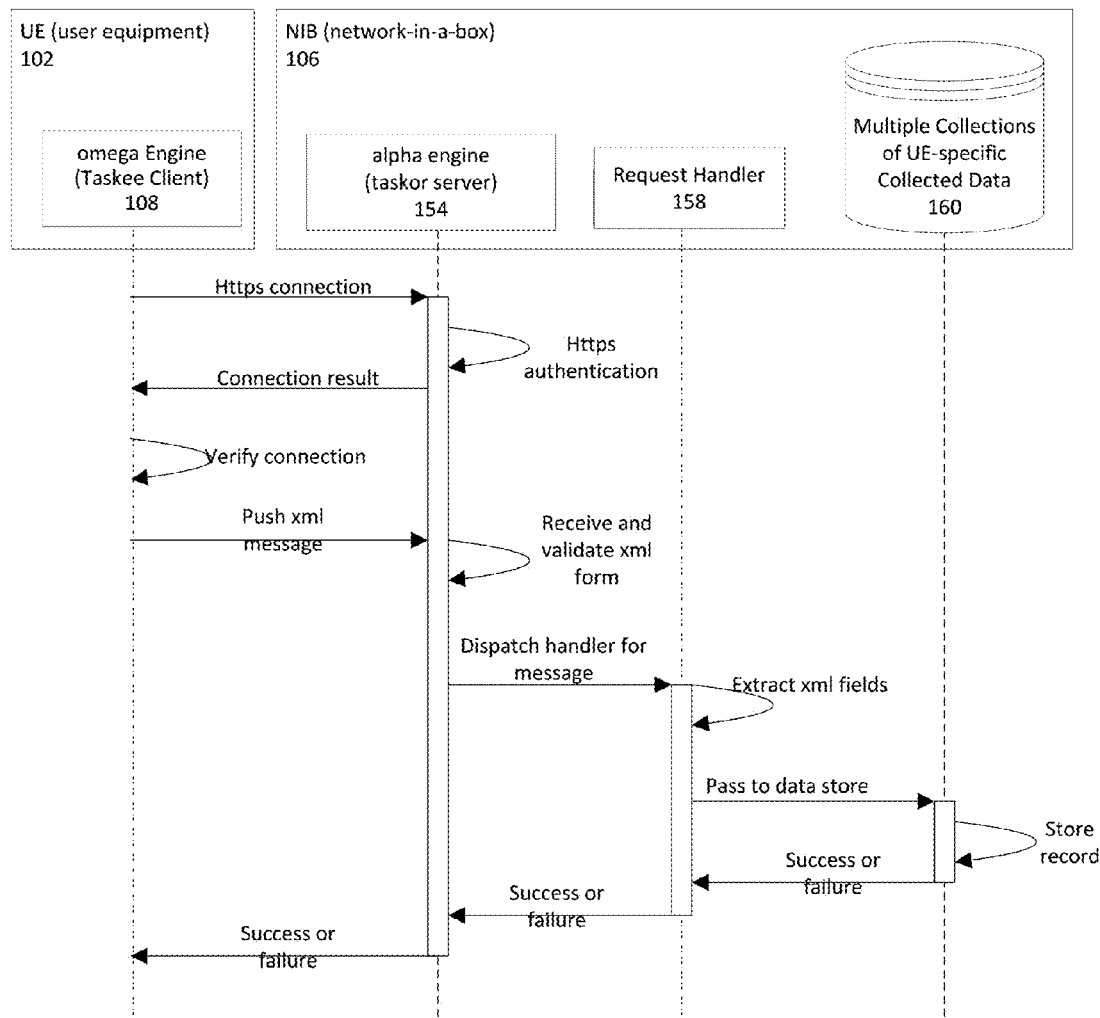
FIG. 5 is an example of a UML (uniform modeling language) sequence diagram, according to an embodiment of the present invention, that is a counterpart to the flowchart of FIG. 4.

FIG. 5 is an example of a UML (uniform modeling language) sequence diagram, according to an embodiment of the present invention, that is a counterpart to the flowchart of FIG. 4.

Figure 6:
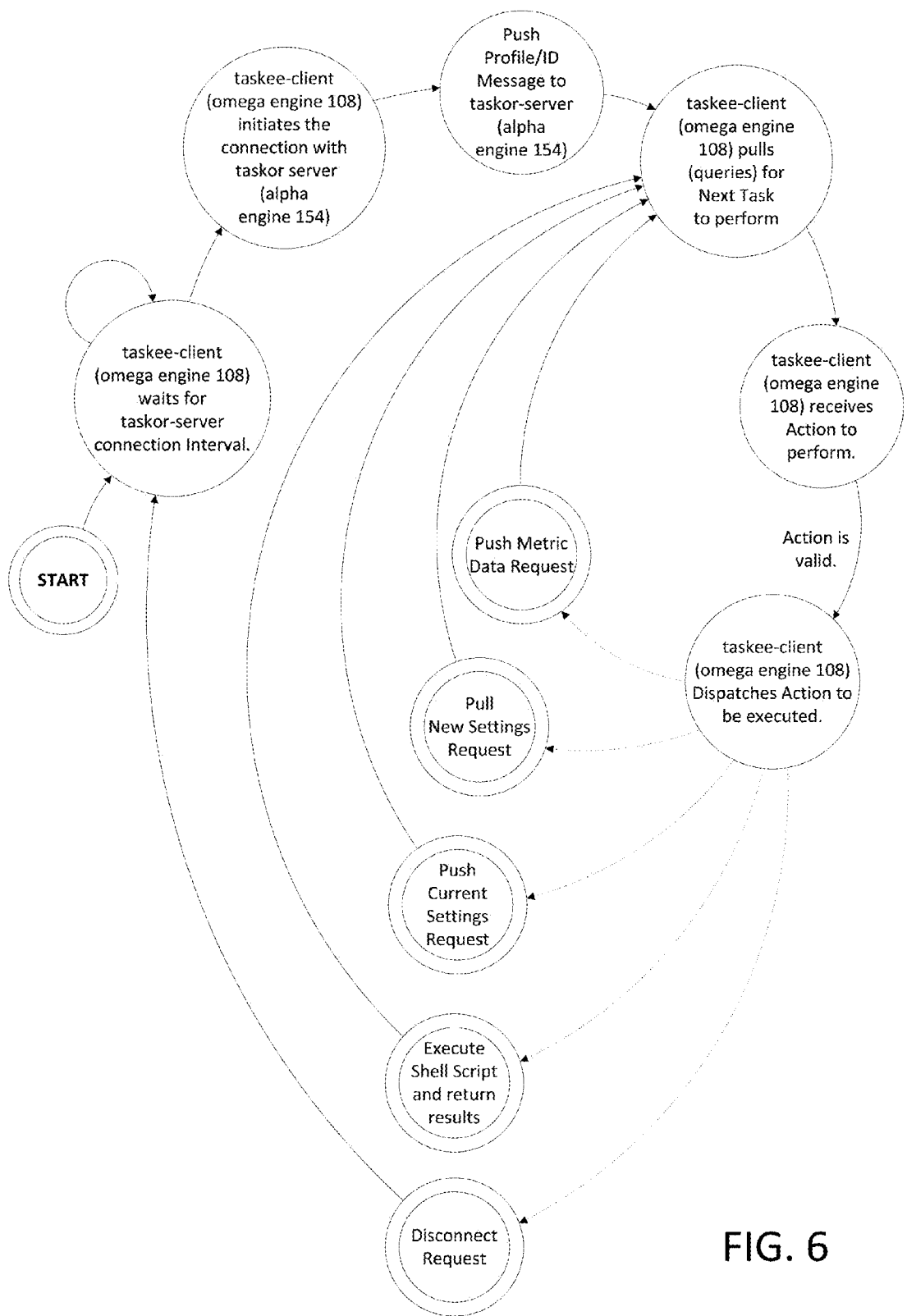
FIG. 6 is an example of a state diagram for a taskee-client (omega engine), according to an embodiment of the present invention.

FIG. 6 is an example of a state diagram for a taskee-client (omega engine), according to an embodiment of the present invention.

Illustrated in FIG. 6 are examples of possible states of the taskee-client (omega engine 108) as it operates to request and execute tasks from the taskor-server (alpha engine 154).

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

While the present invention has been described in the context of methods of operating mobile parameter-sensing nodes connectable via wireless connections to a remote host, those skilled in the art will appreciate that the mechanism of the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A method of operating a remote host in a network of discretely mobile wireless parameter-sensing nodes, each node including sensors for sampling values of parameters that are at least one of internal to and ambient to the node, respectively, and circuitry to collect data representing the sampled values, and send the same to a remote host, the method comprising:
   receiving the collected data from the discretely-mobile wireless parameter-sensing nodes at the remote host, where at least some of the collected data comprises data regarding accelerations undergone by at least some of the nodes;
   organizing the collected data into groups according to proximity of each of the discretely-mobile wireless parameter-sensing nodes to each other;
   determining group-specific ranges regarded as typical by comparing the collected data corresponding to the groups to reference thresholds;
   determining, within the groups, whether there are one or more nodes exhibiting atypical collected data by comparing the collected data to the determined typical ranges; and
   adaptively instructing, within the groups at least one of the nodes to execute one or more tasks that are responsive to the determination of atypical collected data.

2. The method of claim 1, wherein:
the nodes are borne by users, respectively; and
wherein the data regarding accelerations undergone by the nodes represent acceleration spikes, respectively.

3. The method of claim 2, wherein the tasks further comprise tasks that are responsive to one or more common events, the tasks comprising one or more of:
requesting a user of a given node effected by the one or more common events to interact with a man-machine interface on the given node;
streaming a video signal from a given one of the nodes effected by the one or more common events to the remote host; and
instructing a user of a node not effected by the one or more common events albeit proximate to the node effected by the one or more common events to inspect the health of a user of the node effected by the one or more common events.

4. The method of claim 3, wherein adaptively instructing at least one of the nodes to execute the one or more tasks that are responsive to the determination of the atypical collected data further comprises:
instructing at least one of the first and second tasks;
receiving the resultant data, respectively; and
determining, from the resultant data, whether to instruct the third task.

5. The method of claim 2, further comprising:
comparing a set of reference thresholds representing escalating human-physiology danger levels against each of the acceleration spikes, respectively, to determine a corresponding danger level; and
wherein adaptively instructing at least one of the nodes to execute the one or more tasks that are responsive to the determination of the atypical collected data further comprises determining, for each node, one or more tasks that are appropriate to the corresponding danger level.

6. A method of operating a remote host in a network of one or more discretely-mobile wireless parameter-sensing nodes, each node being disposable in a holster worn by a user, and each node comprising sensors for sampling values of parameters that are at least one of internal to and ambient to the node, and circuitry to collect data representing the sampled values, and send the same to a remote host, the method comprising:
receiving portions of the collected data from a given one of the one or more discretely-mobile wireless parameter-sensing nodes including a holstering status and motion-data representing sampled values of motion parameters for the given one or more discretely-mobile wireless parameter-sensing nodes;
inspecting the holstering status to identify if the given one or more discretely-mobile wireless parameter-sensing nodes is holstered on a user;
analyzing the motion-data of the one or more discretely-mobile wireless parameter-sensing nodes identified as being holstered according to human-physiology constraints; and
adaptively instructing the one or more discretely-mobile wireless parameter-sensing nodes to execute one or more tasks that are responsive to results of the analysis.

7. The method of claim 6, wherein:
the motion-data includes acceleration data; and
wherein analyzing the motion-data of the one or more discretely-mobile wireless parameter-sensing nodes identified as being holstered according to human-physiology constraints further comprises:
comparing a set of reference thresholds representing escalating human-physiology danger levels against the acceleration data, respectively, to determine a corresponding danger level; and
wherein adaptively instructing one or more discretely-mobile wireless parameter-sensing nodes to execute one or more tasks that are responsive to results of the analysis further comprises:
determining one or more tasks that are appropriate to the corresponding danger level.

8. The method of claim 6, wherein:
the motion-data includes acceleration data; and
wherein analyzing the motion-data of the one or more discretely-mobile wireless parameter-sensing nodes identified as being holstered according to human-physiology constraints further comprises:
recognizing that one of the one or more discretely-mobile wireless parameter-sensing nodes underwent motion substantially immediately after an acceleration-event so as to arrive at a first position, respectively;
recognizing that:
if the one discretely-mobile wireless parameter-sensing node that underwent motion substantially immediately after an acceleration-event has undergone substantially no motion relative to the first position after elapse of a recovery time, then inferring that a health level of the user of the one discretely-mobile wireless parameter-sensing node that underwent motion substantially immediately after an acceleration-event is substantially deteriorated; and
wherein adaptively instructing one or more discretely-mobile wireless parameter-sensing nodes to execute one or more tasks that are responsive to results of the analysis further comprises:
determining one or more tasks that are appropriate to the deteriorated health level.

9. The method of claim 6, wherein the tasks comprise tasks that are responsive to one or more common events, the one or more common events comprising one or more of:
requesting a user of a given node effected by the one or more common events to interact with a man-machine interface on the given node;
streaming a video signal from a given node effected by the one or more common events to the remote host; and
instructing a user of a node not effected by the one or more common events albeit proximate to the given node effected by the one or more common events to inspect the health of a user of the node effected by the one or more common events.

10. The method of claim 9, wherein adaptively instructing the one or more discretely-mobile wireless parameter-sensing nodes to execute one or more tasks that are responsive to results of the analysis further comprises:
instructing at least one of the first and second tasks;
receiving the resultant data, respectively; and
determining, from the resultant data, whether to instruct the third task.

* * * * *